US012657063B2

(12) United States Patent (10) Patent No.: US 12,657,063 B2
Schworer et al. (45) Date of Patent: Jun. 16, 2026

(54) PRIORITIZED POLLING MECHANISM FOR EFFICIENTLY MANAGING DISTRIBUTED QUEUES IN CONTENT CREATION PIPELINES

(71) Applicant: NETFLIX, INC., Los Gatos, CA (US)

(72) Inventors: Alexander Schworer, San Francisco, CA (US); Gina Shinzu Granger, Studio City, CA (US); Murthy Parthasarathi, San Jose, CA (US); Rajnish Prasad, San Jose, CA (US); Jose Thomas, San Jose, CA (US)

(73) Assignee: NETFLIX, INC., Los Gatos, CA (US)

( * ) Notice: Subject to any disclaimer, the term of this patent is extended or adjusted under 35 U.S.C. 154(b) by 351 days.

(21) Appl. No.: 18/467,193

(22) Filed: Sep. 14, 2023

(65) Prior Publication Data

US 2025/0086017 A1 Mar. 13, 2025

Related U.S. Application Data

(63) Continuation of application No. 18/465,794, filed on Sep. 12, 2023.

(51) Int. Cl.
*G06F 12/00* (2006.01)
*G06F 9/48* (2006.01)
*G06F 9/50* (2006.01)

(52) U.S. Cl.
CPC .......... *G06F 9/5038* (2013.01); *G06F 9/4881* (2013.01)

(58) Field of Classification Search
CPC ........ G06F 9/5038; G06F 9/4881; G06F 8/63; G06F 8/71; G06F 9/5077
See application file for complete search history.

(56) References Cited

U.S. PATENT DOCUMENTS 9,436,449 B1 9/2016 Chandnani et al.
2014/0047140 A1* 2/2014 Otenko ................. G06F 9/5027
710/54

(Continued)

FOREIGN PATENT DOCUMENTS

WO 2022/055891 A1 3/2022
WO 2023/014940 A1 2/2023

OTHER PUBLICATIONS

International Search Report for Application No. PCT/US2024/043905 dated Dec. 19, 2024.

(Continued)

*Primary Examiner* — Shawn X Gu
(74) *Attorney, Agent, or Firm* — Artegis Law Group, LLP

(57) ABSTRACT

In various embodiments a computer-implemented method for launching a task associated with a content production pipeline in a non-native computing environment is disclosed. The method includes publishing user code associated with a task included in a content creation pipeline. The method further includes packaging the user code separately for each of a plurality of computing environments, where each code package enables the user code to execute within a respective computing environment. Further, the method includes storing artifact locations associated with the user code for each of the plurality of computing environments in a task registry. Responsive to the task being selected for execution, the method includes determining, based on a set of rules, a computing environment from the plurality of computing environments in which to execute the task. Additionally, the method includes launching the computing environment in accordance with the rules and executing the task in the computing environment.

20 Claims, 10 Drawing Sheets

(56) References Cited

U.S. PATENT DOCUMENTS

| | | | |
|---|---|---|---|
| 2015/0347189 A1* | 12/2015 | Steffen | G06F 9/4893 |
| | | | 718/103 |
| 2019/0190778 A1 | 6/2019 | Easterling et al. | |
| 2019/0332433 A1 | 10/2019 | Nadimpalli et al. | |
| 2021/0096897 A1 | 4/2021 | Youakim et al. | |
| 2021/0342193 A1 | 11/2021 | Anand | |
| 2023/0133020 A1 | 5/2023 | Sakalley et al. | |
| 2023/0205601 A1 | 6/2023 | Rao | |
| 2023/0342373 A1 | 10/2023 | Kotni et al. | |

OTHER PUBLICATIONS

Jain et al., "Orchestrating Production Processes with Cloud Native Pipelines", Proceedings of the 13th ACM International Conference on Bioinformatics, DOI: 10.1145/3543664.3543682, Aug. 7, 2022, pp. 1-7.
Non Final Office Action received for U.S. Appl. No. 18/465,794, dated Jan. 16, 2026, 30 pages.
Final Office Action received for U.S. Appl. No. 18/465,794, dated May 4, 2026, 33 pages.

* cited by examiner

600

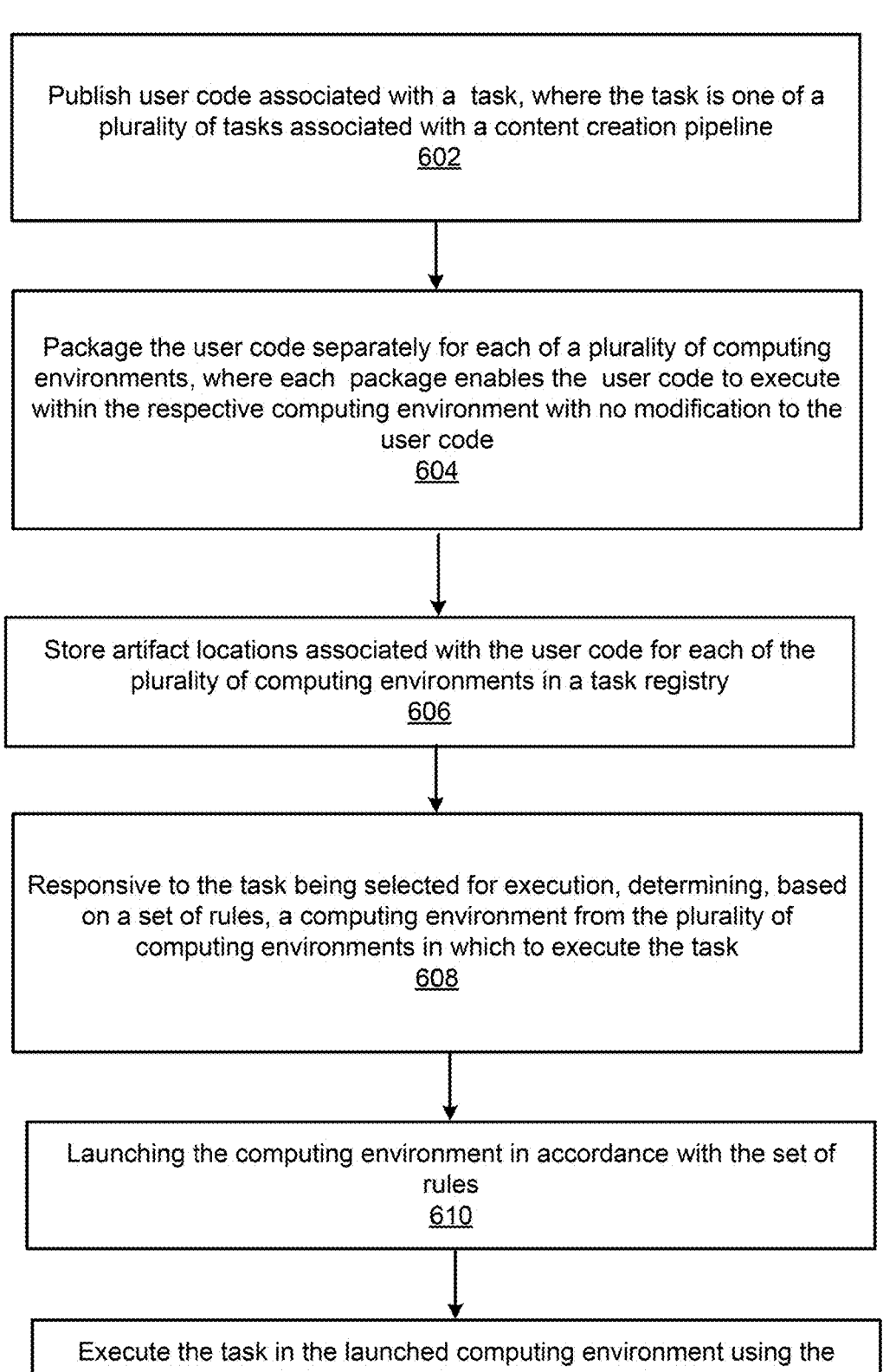

Publish user code associated with a task, where the task is one of a plurality of tasks associated with a content creation pipeline
602

Package the user code separately for each of a plurality of computing environments, where each package enables the user code to execute within the respective computing environment with no modification to the user code
604

Store artifact locations associated with the user code for each of the plurality of computing environments in a task registry
606

Responsive to the task being selected for execution, determining, based on a set of rules, a computing environment from the plurality of computing environments in which to execute the task
608

Launching the computing environment in accordance with the set of rules
610

Execute the task in the launched computing environment using the artifact locations from the task registry
612

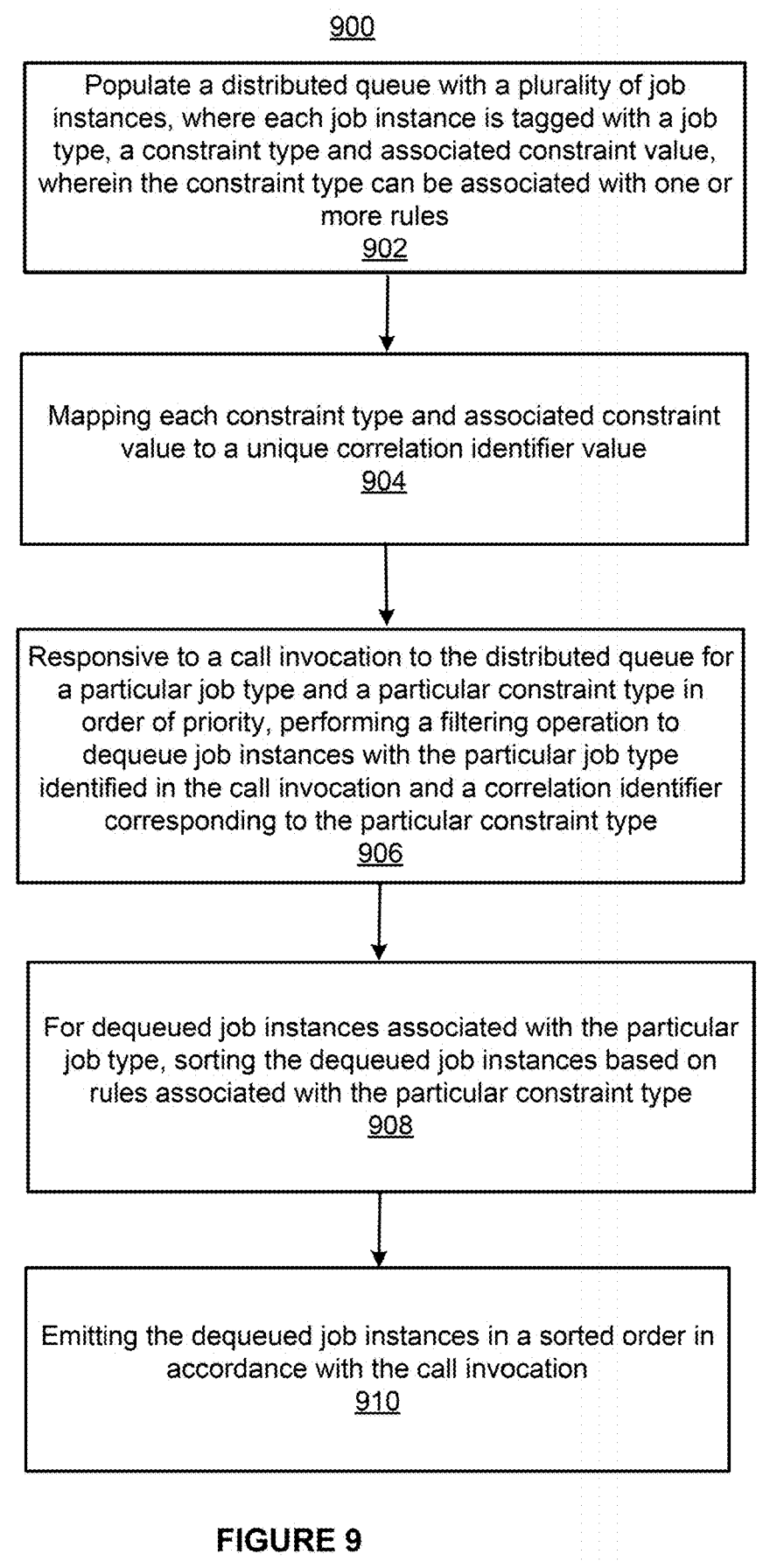

Populate a distributed queue with a plurality of job instances, where each job instance is tagged with a job type, a constraint type and associated constraint value, wherein the constraint type can be associated with one or more rules
902

Mapping each constraint type and associated constraint value to a unique correlation identifier value
904

Responsive to a call invocation to the distributed queue for a particular job type and a particular constraint type in order of priority, performing a filtering operation to dequeue job instances with the particular job type identified in the call invocation and a correlation identifier corresponding to the particular constraint type
906

For dequeued job instances associated with the particular job type, sorting the dequeued job instances based on rules associated with the particular constraint type
908

Emitting the dequeued job instances in a sorted order in accordance with the call invocation
910

FIGURE 9

PRIORITIZED POLLING MECHANISM FOR EFFICIENTLY MANAGING DISTRIBUTED QUEUES IN CONTENT CREATION PIPELINES

CROSS-REFERENCE TO RELATED APPLICATIONS

This application is a continuation of the co-pending U.S. Patent Application titled "A HYBRID TASK EXECUTION FRAMEWORK FOR SEAMLESS TASK EXECUTION WITHIN CLOUD-NATIVE PIPELINES," Ser. No. 18/465, 794, filed Sep. 12, 2023. The subject matter of this related application is hereby incorporated herein by reference.

BACKGROUND

Field of the Various Embodiments

The various embodiments relate generally to creating digital content and, more specifically, to techniques for efficiently collaborating on digital assets used in the creation of digital content.

Description of the Related Art

Distributed computing systems include many different hardware and software components that operate to provide a variety of services to clients of the distributed computing systems. For example, one distributed computing system executing video production services could enable various endpoint devices to access data stored in remote data stores and modify data using a suite of digital content creation tasks or applications.

Digital content creation involving various creators across distributed computing systems, including those from different locations, poses a significant challenge. As the number of collaborators to a given project increases, the complexity of efficiently sharing, tracking, and transforming the data produced by these content creators also grows. Generalized content production processes traditionally rely on manual or semi-automated processing workflows and pipelines, which necessitate frequent user intervention and can often be cumbersome to use, leading to potential errors.

Moreover, developers working on generalized content production processes commonly face the challenge of ensuring that the code they develop functions seamlessly across diverse environments, encompassing a multitude of tasks and applications utilized in the production of digital content. Sharing common processing tasks across multiple environments presents a significant challenge for developers due to the considerable time and effort required to ensure proper execution of the code in diverse settings. Achieving consistency and seamlessness across these diverse environments demands a substantial investment of time and resources.

Another significant challenge encountered by generalized content production processes is the complexity of prioritizing local compute resources. In processing pipelines where collaborators utilize a mix of cloud-based and localized resources, it becomes crucial to adjust the priority of scheduled jobs to ensure optimal pipeline efficiency. However, existing generalized content production processes lack an efficient method to recompute the priority of jobs on-the-fly and dynamically update their order accordingly. This limitation hinders the seamless and effective allocation of resources, affecting the overall productivity of the production process.

As the foregoing illustrates, what is needed in the art are more effective techniques for efficiently sharing, tracking, and transforming production data on a scalable architecture across different environments.

SUMMARY

One embodiment sets forth a computer-implemented method for implementing a task associated with a content creation pipeline in various computing environments. The method includes publishing user code associated with a task included in a content creation pipeline, wherein the task is one of a plurality of tasks associated with the content creation pipeline, wherein the content creation pipeline is configured in a cloud computing environment, and wherein tasks associated with the content creation pipeline can execute in a plurality of computing environments. The method further includes packaging the user code separately for each of the plurality of computing environments, wherein each package enables the user code to execute within the respective computing environment with no modification to the user code. Additionally, the method includes storing artifact locations associated with the user code for each of the plurality of computing environments in a task registry. Responsive to the task being selected for execution, the method includes determining, based on a set of rules, a computing environment from the plurality of computing environments in which to execute the task. The method also includes launching the computing environment in accordance with the set of rules and executing the task in the computing environment using the artifact locations from the task registry.

One embodiment sets forth a computer-implemented method for implementing a prioritized polling scheme for a distributed queueing system comprising job instances associated with a content creation pipeline. The method includes populating a distributed queue with a plurality of job instances, wherein each job instance is tagged with a job type, a constraint type and an associated constraint value, and wherein the constraint type can be associated with one or more rules. Further, the method includes mapping each constraint type and associated constraint value to a unique correlation identifier value, wherein the unique correlation identifier value represents an aggregate priority of a corresponding job instance. Responsive to a call invocation to the distributed queue to return job instances associated with a particular job type and a particular constraint type in priority order, the method includes performing a filtering operation to dequeue job instances with the particular job type identified in the call invocation and a correlation identifier corresponding to the particular constraint type identified in the call invocation. Additionally, the method includes sorting the dequeued job instances based on rules associated with the particular constraint type. The method further includes emitting the dequeued job instances in a sorted order of priority in accordance with the call invocation.

At least one technical advantage of the disclosed techniques relative to the prior art lies in the streamlined development process for code intended to be utilized in multiple diverse environments within a content production pipeline. Through the novel approach of packaging code developed for various tasks involved in the production process, these techniques enable seamless execution of tasks on different platforms, irrespective of their specific operating requirements. As a result, developers can now concentrate solely on enhancing the functionality and quality of their code without being burdened by the necessity to ensure its compatibility with every platform. By leveraging the platform-agnostic nature of the disclosed techniques, developers can devote more time to the creative aspects of code development and less on troubleshooting and adjustments for each individual platform. This efficiency leads to faster code deployment, accelerated content production, and ultimately, a more streamlined and robust content production pipeline. Overall, the disclosed techniques also enhance code development by freeing developers from platform-specific constraints and infrastructure complexities, thereby empowering them to focus on innovation and creativity, all while delivering consistent and high-quality performance across diverse environments.

Moreover, the disclosed techniques offer significant advancements in the shareability and reusability of common processing tasks, thereby, benefiting multiple platforms and production pipelines. For example, similar tasks are typically used when creating similar types of content (e.g., visual effects, animation, etc.). These shared tasks can now be seamlessly reused across diverse platforms and production pipelines, leading to a streamlined content creation process and reduced computational burden. By enabling the sharing and reusability of tasks, content creation becomes more efficient and expeditious. Developers no longer need to reinvent the wheel by writing code from scratch for each production process. Instead, they can leverage pre-existing, proven tasks, saving valuable time and effort. This enhanced efficiency translates into cost savings as content can now be produced more affordably, resulting in benefits for both creators and consumers. With a library of common tasks readily available, developers can focus on refining and fine-tuning the unique aspects of their content, elevating the quality and creativity of the final output.

An additional noteworthy advantage of the disclosed techniques is the capacity to significantly expedite production processes through dynamic reprioritization of computing resources on-the-fly. By enabling the system to recompute and adjust the priority of existing scheduled jobs in real-time, these techniques enhance the overall efficiency and responsiveness of the pipeline. The ability to reevaluate and adapt the prioritization of tasks dynamically leads to more optimal resource allocation, ensuring that critical or time-sensitive jobs receive the necessary computing power promptly. Conversely, less urgent tasks can be temporarily deprioritized, freeing up resources for more pressing demands. This dynamic resource management contributes to a smoother and more streamlined execution of the content production pipeline. This on-the-fly adaptability also enables the pipeline to be more resilient and responsive to changing conditions, such as unexpected surges in processing requirements or variations in workload intensity. The system can automatically adjust its priorities to maintain peak performance and maximize throughput, minimizing potential bottlenecks and reducing overall production time. Furthermore, the ability to efficiently manage computing resources translates into cost savings, as resources are utilized more judiciously, minimizing idle time and unnecessary expenditures. The disclosed techniques empower production teams to optimize their resource utilization and ensure that computational power is harnessed efficiently, ultimately leading to more cost-effective content production. Furthermore, the capability to dynamically reprioritize computing resources on-the-fly represents a fundamental improvement in the content production process. By adapting to changing demands and optimizing resource allocation, the disclosed techniques deliver expedited production timelines, heightened responsiveness, and increased cost-efficiency, thereby driving overall productivity and performance higher.

These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 6 is a flow diagram of method steps for launching a task associated with a content production pipeline in an optimal computing environment, according to various embodiments of the present invention.

FIG. 9 is a flow diagram of method steps for implementing a prioritized polling scheme for a distributed queueing system comprising job instances associated with a content creation pipeline, according to various embodiments of the present invention.

DETAILED DESCRIPTION

In the following description, numerous specific details are set forth to provide a more thorough understanding of the various embodiments. However, it will be apparent to one skilled in the art that the inventive concepts may be practiced without one or more of these specific details. Note that for explanatory purposes, multiple instances of like objects in FIG. 1 are symbolized with reference numbers identifying the object and parenthetical numbers(s) identifying the instance where needed.

System Overview

Figure 1:
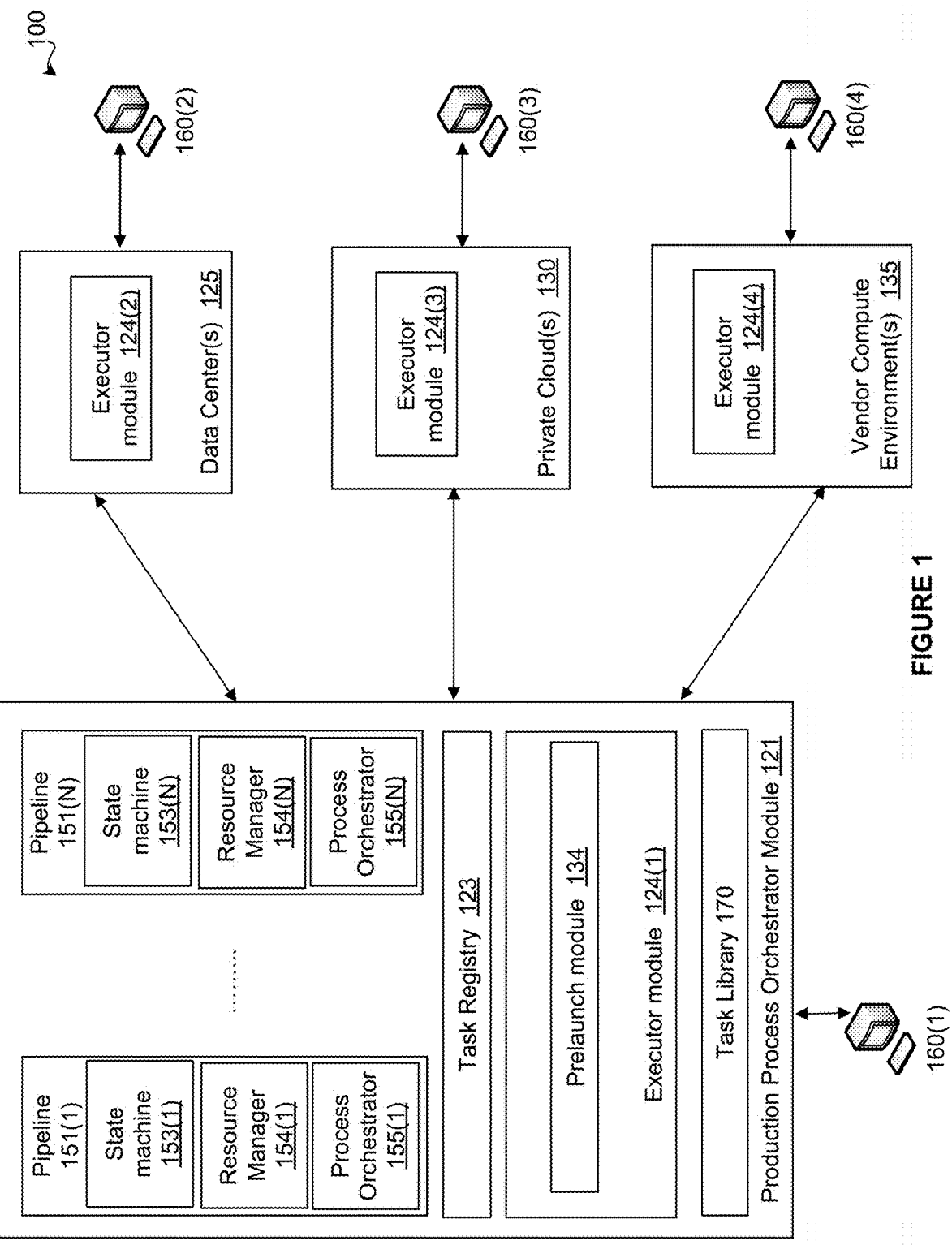
FIG. 1 is a conceptual illustration of a system configured to implement one or more aspects of the various embodiments.

FIG. 1 is a conceptual illustration of a system 100 configured to implement one or more aspects of the various embodiments. As shown, in some embodiments, the system 100 includes, without limitation, a production process orchestrator module 121, one or more data centers 125, one or more private clouds 130, and one or more third-party vendor environments 135. The production process orchestrator module 121 comprises one or more fully automated production pipelines 151(1) . . . 151(N). Each pipeline comprises at least a state machine 153 (e.g., state machines 151(1) . . . 151 (N)), a resource manager 154 (e.g., resource managers 154(1) . . . 154(N)), and a process orchestrator 155 (e.g., process orchestrator 155(1) . . . 155(N)). The production process orchestrator module 121 also comprises a task registry 123, an executor module 124(1) and a task library 170.

"Cloud" or "in the cloud" refers to a network model in which an entity operates network resources (e.g., processor capacity, network capacity, storage capacity, etc.), located for example in a data center, and makes those resources available to users and/or other entities over a network. In some embodiments, the production process orchestrator module 121 can be implemented as part of a "public cloud." A "public cloud" is a cloud implementation where an entity operates network resources in order to provide them to users that are not associated with the entity and/or to other entities. Simple Storage Service (S3) is a type of cloud computing service. For example, cloud computing network resources may be provided by a provider entity to a subscribing entity, where the subscribing entity is a digital content developer or content streaming platform (or service) implementing a production process orchestrator module 121.

In some implementations, the provider entity can, for example, allow a subscriber entity (e.g., the digital content creator) to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In certain implementations, the subscriber entity may possess their own data centers or private clouds (e.g., data center(s) 125 and private cloud(s) 130) that establish communication with the public cloud housing the production processor orchestrator module 121. In various embodiments, a "private cloud" refers to a cloud infrastructure where the entity exclusively provides network resources solely for its own users. By maintaining their data centers or private clouds, the subscriber entity gains additional control and customization over their cloud environment. This level of ownership allows them to tailor the infrastructure to meet specific security, performance, and regulatory requirements. Furthermore, since the resources are reserved exclusively for the entity's use, it ensures a higher degree of data privacy and isolation from other organizations, instilling confidence in sensitive data handling. The seamless communication between the subscriber entity's private cloud and the public cloud where the production processor orchestrator module operates fosters a hybrid cloud environment. This hybrid approach combines the scalability and cost-effectiveness of the public cloud with the dedicated resources and control of the private cloud. By embracing this hybrid model, the subscriber entity can strategically allocate workloads based on their unique needs. For example, they can utilize the public cloud for bursty or unpredictable tasks, taking advantage of its elasticity to accommodate sudden spikes in demand. Conversely, they can opt to process sensitive or mission-critical operations within their private cloud, guaranteeing a higher level of data governance and compliance. The presence of data centers or private clouds under the control of the subscriber entity, in conjunction with the public cloud's production processor orchestrator module, leads to a powerful and flexible cloud ecosystem. This hybrid cloud approach allows for the orchestration of hybrid pipelines and ensures optimal performance, data privacy, and resource utilization, empowering the subscriber entity to achieve its objectives with a blend of public and private cloud resources.

In some embodiments, the data center(s) 125 can comprise an executor module 124(2). Similarly, in some embodiments, the private cloud(s) 130 can also comprise an executor module 124(3). As will be explained further below, the respective executor modules 124 implement the hybrid task execution framework that is used to execute the tasks associated with any of the pipelines 151 across a variety of computing environments and platforms associated with the orchestrated module 121.

In certain implementations, certain third-party vendor compute environment(s) 135 can also be associated with a subscriber entity where the third-party vendors may contribute to the creation of content being produced by the subscriber entity. For example, the third-party vendor may be performing some animation-related work associated with a movie production pipeline. It should be noted that the third-party vendors can also have any other relationship with the subscriber entity in relation to content production. In some embodiments, the vendor compute environment(s) 135 can also comprise an executor module 124(4).

Each of the production process orchestrator module 121, the data center(s) 125, the private cloud(s) 130 and the vendor compute environment(s) 135 can be associated with one or more endpoints 160 (e.g., endpoints 160(1)-160(4) as shown in FIG. 1). Endpoints are physical devices that connect to and exchange information with a computer network. Some examples of endpoints are mobile devices, desktop computers, virtual machines, embedded devices, and servers.

In some other embodiments, the system 100 can include any number and/or types of other compute instances, other display devices, other databases, other data storage services, other services, other compute engines, other input devices, output devices, input/output devices, search engines, or any combination thereof.

As described in greater detail previously herein, one of the challenges associated with developing content is that as the number of collaborators to a given project increases, the complexity of efficiently sharing, tracking, and transforming the data produced by these content creators also grows.

Production Process Orchestrator

To effectively tackle the aforementioned challenges, the system 100 incorporates the production process orchestrator module 121, which may be operated by a content developer and/or provider, including entities such as streaming services. The orchestrator module 121 facilitates seamless content creation and collaboration on a global scale. The primary objective of the production process orchestrator module 121 is to establish a cohesive connection among content creators worldwide, enabling them to efficiently share, track, and transform production data. The module operates on a highly scalable architecture, adaptable to cater to diverse production requirements, and ensuring optimal performance regardless of project size or complexity.

Moreover, the orchestrator module 121 plays a vital role in promoting collaboration within geographically distributed creative teams. By providing a distributed platform that is managed centrally using fully automated pipelines (e.g., pipelines 151) executed in the cloud, the orchestrator module 121 fosters the seamless sharing and collaborative development of digital assets. This collaborative approach enhances overall productivity and empowers creative professionals to work together effectively, transcending geographical barriers. A key advantage of the orchestrator module 121 is its ability to save valuable time for developers. This time-saving attribute is achieved through the utilization of shared infrastructure and components for building fully automated production pipelines. By leveraging preexisting, tried-and-tested tasks and resources, developers can streamline their workflow, eliminating the need to reinvent the wheel for each project. This efficiency ultimately translates into accelerated development cycles and more rapid delivery of high-quality content.

In some implementations, the pipelines 151 are used to fully automate cloud-native workflows and reliably orchestrate the flow of data throughout the entire content production process. The pipelines 151, for example, can be configured using a pipeline editing tool provided through a graphical user interface (GUI) associated with the orchestrator module 121 that allows content developers to choose from a set of reusable standard or customized tasks that are part of a library. For example, the pipelines 151 can comprise one or more reusable tasks or set of tasks associated with a technical process or workflow used during content development or production. In some embodiments, pipelines 151 can also comprise sub-pipelines, where each sub-pipeline is associated with one or more reusable tasks associated with a part of a technical process or workflow. The pipelines 151 enable developers to share common processing tasks across the multiple automation pipelines 151 and to configure the pipelines 151 for re-use across multiple contexts (e.g., different productions, sequences, etc.)

Each pipeline 151 can also be configured with certain customizable triggers that allow particular sub-pipelines or set of tasks to execute in response to an event. The pipelines 151 also provide scalable and secure-by-default authorization primitives for developers building workflows that work on sensitive production data.

In some embodiments, each of the pipelines 151 comprises a state machine 153, a resource manager 154 and a process orchestrator 155. The state machine 151 offers developers a tool to define and manage workflow processes intricately linked to content creation or production while ensuring robust authorization rules enforcement. For instance, these authorization rules may control access to content items or assets, dictating who can view or edit them. To provide a concrete example, a process within the state machine could represent a well-defined model for reviewing or approving content production workflows, or it could encompass a comprehensive quality check process.

The state machine 151 can also be configured with certain triggers that are monitored to execute one or more tasks in response to a trigger condition occurring. The state machine 151 offers additional flexibility by allowing configuration of specific triggers that can be monitored to initiate or continue the execution of one or more tasks when the specified trigger condition occurs. For example, a sub-pipeline in a pipeline may be triggered by the state machine 151 when a vendor delivers all the raw assets needed for visual effects associated with a particular content item to be computed.

By incorporating trigger-based functionality, the state machine 151 can actively listen for predefined events or conditions. Once the trigger condition is detected, the state machine 151 automatically initiates the corresponding tasks within the workflow. This dynamic and event-driven approach ensures a timely and efficient response to changes in the application's environment or data inputs. Through this configurable trigger system, developers can design workflows that respond seamlessly to real-time events or data updates, optimizing the overall efficiency of the system. Whether it's a new data arrival, a user action, or any other designated event, the state machine can swiftly initiate the relevant tasks, maintaining a well-orchestrated and adaptive workflow. In this way, the trigger-based configuration of the state machine 151 enables developers to create highly responsive and automated systems, where tasks are executed precisely when needed, reducing manual intervention and enhancing the overall agility of the corresponding pipeline.

These state-based workflows also streamline the content creation pipeline, enhancing efficiency and coordination among team members. Notably, the state machine 153 further enhances security and access control by enabling fine-grained authorization across different states of the pipeline. This capability allows precise control over permissions at each stage, ensuring that only authorized entities can access specific data during a particular state of the pipeline. By leveraging the state machine's ability to enforce access restrictions, content developers can prevent unauthorized access to sensitive data at critical stages, bolstering data privacy and compliance efforts. This is especially crucial in scenarios where multiple domains interact within the same pipeline, as it enables seamless collaboration while preserving data confidentiality. The state machine 151 empowers developers to design and regulate complex workflow processes associated with content creation or production. With its built-in authorization rule enforcement and fine-grained access controls, the state machine ensures both efficiency and security, thereby, resulting in a seamless and protected content creation process.

In some embodiments, the resource manager 154 manages the assets and resources associated with a corresponding pipeline. The assets or resources may be off-the-shelf assets or certain custom assets that are developed specifically for a given pipeline. The resource manager 154, for example, provides a single interface to connect a corresponding pipeline to data entities on which the pipeline operates. For example, the resource manager can connect the pipeline to globally distributed file-systems or to compute resources. The resource manager 154 can manage a resource in accordance with a state transition graph associated with each resource. The state transition graph enables async-await logic based on a resource's state. In some embodiments, the resource manager 154 may also provide an interface for querying and accessing resources or assets developed by or for the pipeline.

In some embodiments, the process orchestrator 155 manages the tasks and actions that are executed using the resources and assets managed by the resource manager 154. In some embodiments, the process orchestrator 155 provides an async-await event-based pattern to register a dependency on a resource that is not yet available so that the workflow can automatically continue once the resource is available. In other words, the process orchestrator 155 allows tasks to register their need for a specific resource that is currently unavailable. The process orchestrator 155 will then wait for the resource to become available and automatically proceed with the dependent tasks once the resource is ready, optimizing the workflow's efficiency and handling resource dependencies seamlessly. Waiting for resources to become available eliminates costly polling of the resources or assets by the applications. It also enables automated cascading execution of sub-pipelines based on upstream resource state changes. For example, if a resource becomes available, sub-pipelines that depend on a resource's availability can automatically be executed using the functionalities enabled by the process orchestrator 155.

In some embodiments, the orchestrator module 121 can re-use parts or the entirety of a given pipeline 151 in other pipelines. Furthermore, the orchestrator module can also re-use individual tasks within workflows, thereby, conserving development resources. In some embodiments, the orchestrator module 121 comprises a task library 170, which provides reusable connections to common infrastructure services, various storage systems, and other encoding, rendering and notification services. The task library 170 can comprise a collection of pre-defined tasks or functions that can be reused across the various pipelines 151. The task library 170 is a repository of task templates or code snippets that encapsulate specific functionality. One of the purposes of the task library 170 is to promote code reusability and modularity. Developers can create and store commonly used tasks as functions or modules in the task library, making it easier to use them in multiple parts of the application without duplicating code.

In some embodiments, the process orchestrator module 121 allows the content creator to configure fully automated pipelines using the set of available tasks from the task library 170. Once a pipeline is configured to perform a specific function, the state machine 153, resource manager 154, and process orchestrator 155 seamlessly collaborate to execute the pipeline from start to finish in a fully automated manner, eliminating the need for any user intervention. In this workflow, the state machine efficiently manages the progression of tasks and states, ensuring that each step is executed in the correct order. The resource manager diligently handles the allocation and utilization of resources required for each task, optimizing efficiency and performance throughout the pipeline's execution. The process orchestrator coordinates the flow of information and tasks, orchestrating their execution in an intelligent manner, while monitoring the progress to ensure a successful completion of the entire pipeline. For example, if a particular resource needed to execute the pipeline is unavailable, the process orchestrator 155 will automatically wait for the resource to become available before executing any sub-pipelines that depend on that resource.

This intelligent collaboration among the state machine, resource manager, and process orchestrator culminates in a highly efficient and error-free execution of the configured pipeline. As a result, developers can trust in a streamlined and hands-free workflow, allowing them to focus on other critical aspects of the project, secure in the knowledge that the automated system will handle the pipeline execution with reliability.

In some embodiments, the process orchestrator module 121 can also provide built-in alerts, monitoring and analysis systems to track progress of the pipelines 151, notify support teams and analyze pipeline usage (e.g., to capture pipeline success/failure rates to inform future development).

A production is a highly collaborative process, with hundreds of people working together to realize a single creative vision. Providing reliable access to the media and managing associated permissions that teams need to do their work is a critical problem. Further, as noted above, in some embodiments, multiple domains can interact within the same pipeline. To address this challenge, the orchestrator module 121 is configured to be aware of different domains. Domains are pre-defined groupings that roughly describe a phase or department within a production. Each resource or asset can be grouped or associated with a particular domain. Note that a resource may also be associated with more than one domain. For example, predefined domains within a production pipeline may be related to editorial, picture finishing, etc. If a user is granted access to a particular domain (e.g., the editorial domain), then the user is granted read-write access to the assets and files stored within that domain but not to any other assets within another domain.

In some embodiments, each domain may be associated with a pre-defined number of levels of role-based access that a user may be granted within a particular domain (e.g., admin, manager, collaborator or uploader). In some implementations, user's permissions are additive, so that they can be granted access to multiple domains within a production, with varying degrees of access (from write-only access to full permissions to read, write, delete and update data). In some implementations, the state machine 153 in a pipeline relies on a user's domain membership during pipeline execution to determine authorization (e.g., an editor in the editorial domain can configure and submit a final cut review pipeline, but an artist in a production visual effects domain could not).

Hybrid Task Execution

As noted above, developers working on generalized content production processes commonly face the challenge of ensuring that the code they develop functions seamlessly across diverse environments, encompassing a multitude of tasks and applications utilized in the production of digital content. Referring more specifically to the system 100 of FIG. 1, certain tasks that may be configured as part of a cloud-native pipeline (e.g., pipeline 151), may execute more efficiently outside of the orchestrator module 121. For instance, data associated with a particular task may be predominantly located in a different environment (e.g., the data may be part of the vendor compute environment 135 or in a data center 125 operated in a private cloud by the content producer). It may, therefore, be more efficient to execute such tasks within the environment where the data to be used by the tasks is located. In other words, the tasks may execute more efficiently "on the edge." Edge computing is a decentralized computing infrastructure where data processing is done closer to the source of data, rather than sending all data to a centralized cloud server. This is particularly useful in scenarios where real-time processing and reduced latency are essential.

In order to address this challenge, each computing environment that may be involved in the content creation process (e.g., data center 125, private cloud 130, vendor compute environment 135) can include an executor module 124 that manages the execution of tasks outside the cloud-native environment. The executor modules 124 in the various environments provides a sandbox where code for a task associated with a given pipeline can execute without requiring user intervention to configure the code for the respective environment. The executor modules 124 can be configured to abstract the execution of the user code.

In some embodiments, the orchestrator module 121 can also have an executor module 124(1) that is particularized for managing the execution of tasks within the computing environment of the orchestrator module 121. In some embodiments, the executor module 124(1) may perform some of the same functionalities as the executor modules in the various computing environments (e.g., modules 124(2), 124(3), 124(4), etc.). In some embodiments, the executor module 124(1) configured as part of the orchestrator module 121, however, may also comprise additional functionality as compared with the executor modules localized to the various other computing environments (e.g., executor modules 124(2), 124(3), 124(4), etc.).

For example, as will be explained further below, executor module 124(1) can work in conjunction with the various pipelines to determine in which environment a particular task should be executed. More specifically, the executor module 124(1) can include functionality to determine, based on a set of rules, which of the compute environments is best-suited for executing a particular task if this decision is not pre-configured or pre-specified in a given pipeline 151.

As noted previously, the pipelines 151 in the orchestrator module 121 can leverage the power of shareability and reusability by utilizing standard or custom tasks available in the task library (e.g., task library 170) to implement specific functionalities. Users developing content may execute one or more of these reusable tasks from the task library as part of the execution of a given pipeline. However, there may be one of many reasons why the execution of a given task is more efficient in a compute environment outside of the orchestrator module 121. It is impractical and expensive to develop code or tasks specifically for each of the computing environments that is coupled to the orchestrator module 121.

In some embodiments, the respective executor modules 124 (executing on each of the computing environments in communication with the orchestrator module 121) implement a hybrid task execution framework that allows for the execution of developer code (associated with reusable tasks) in heterogenous computing environments without the need for the code author to be concerned about the intricacies of any specific environment. The heterogenous computing environments can include the public cloud, private clouds and even compute nodes within private networks. For instance, consider the scenario where a content creator or streaming service receives image files from multiple vendors (e.g., vendor compute environments 135) that require thorough checks for discrepancies, such as dead pixels. To address this, a developer can create a task or develop code to perform the necessary verification. However, the code must be able to run seamlessly in various environments, whether it's at the vendor's location, where the files are verified before sending, or within the streaming service's cloud environment (e.g., within the orchestrator module 121) after the streaming service has already received the files.

Continuing with the example from above, in order to prevent uploading content with errors, it may be more efficient to execute the checking of dead pixels in the vendor compute environment prior to uploading to the orchestrator module 121. For example, a vendor compute environment 135 may be a local laptop computer that is part of an on-premises computing environment associated with the vendor. In some embodiments, the executor module 124 enables code to be authored once and executed effortlessly across multiple environments. By abstracting the differences between the diverse environments, developers can write code without worrying about the underlying infrastructure.

The executor module 124, in effect, provides a runtime sandbox, where user code is executed. This sandbox provides a managed runtime environment, abstracting away the intricate details and considerations of each specific runtime. This abstraction ensures that developers can focus solely on writing functional code without being burdened by the intricacies of different compute environments. With the managed runtime environment provided by an executor module 124, developers can experience a high level of abstraction, shielding them from the complexities of the underlying runtime. By eliminating the need for developers to grapple with environment-specific intricacies, the hybrid task execution framework leads to the development of robust and scalable pipelines.

In some embodiments, the hybrid task execution framework implemented by the various executor modules 124 will manage the resources required by a particular task. In particular, the executor modules 124 can be programmed to gather all the resources that a particular task execution in a particular environment will require prior to executing the task. By the time the code for the task is executed, the resources the tasks need will be available for the task to execute on.

As mentioned above, the orchestrator module 121 manages the execution of the pipelines 151. In some embodiments, the orchestrator module 121 stitches together the results of the execution of tasks, including tasks executing on the edge across the various executor modules 124, in order to execute a given pipeline 151. For example, the tasks executing in the various executor modules 124 (not including executor module 124(1)) may upload the data resulting from the execution of the respective tasks to the orchestrator module 121, which then compiles the results and uses them in the execution of the associated pipeline in the cloud. In some embodiments, the executor module 124(1) of the orchestrator module 121 can be configured to compile the results. In some implementations, after each task is executed by a given pipeline 151, the pipeline can be configured to report back to the executor module 124(1), which then determines where the next task will execute using the prelaunch module 134. In some embodiments, the author of a pipeline 151 can pre-program, as part of the pipeline configuration, the location where certain tasks should be executed based on the task type and the pipeline objective. In other embodiments, the prelaunch module 134 of the executor module 124(1) can be configured to determine the location for executing a task automatically based on various rules, including efficiency, locality, speed, etc.

Figure 2:
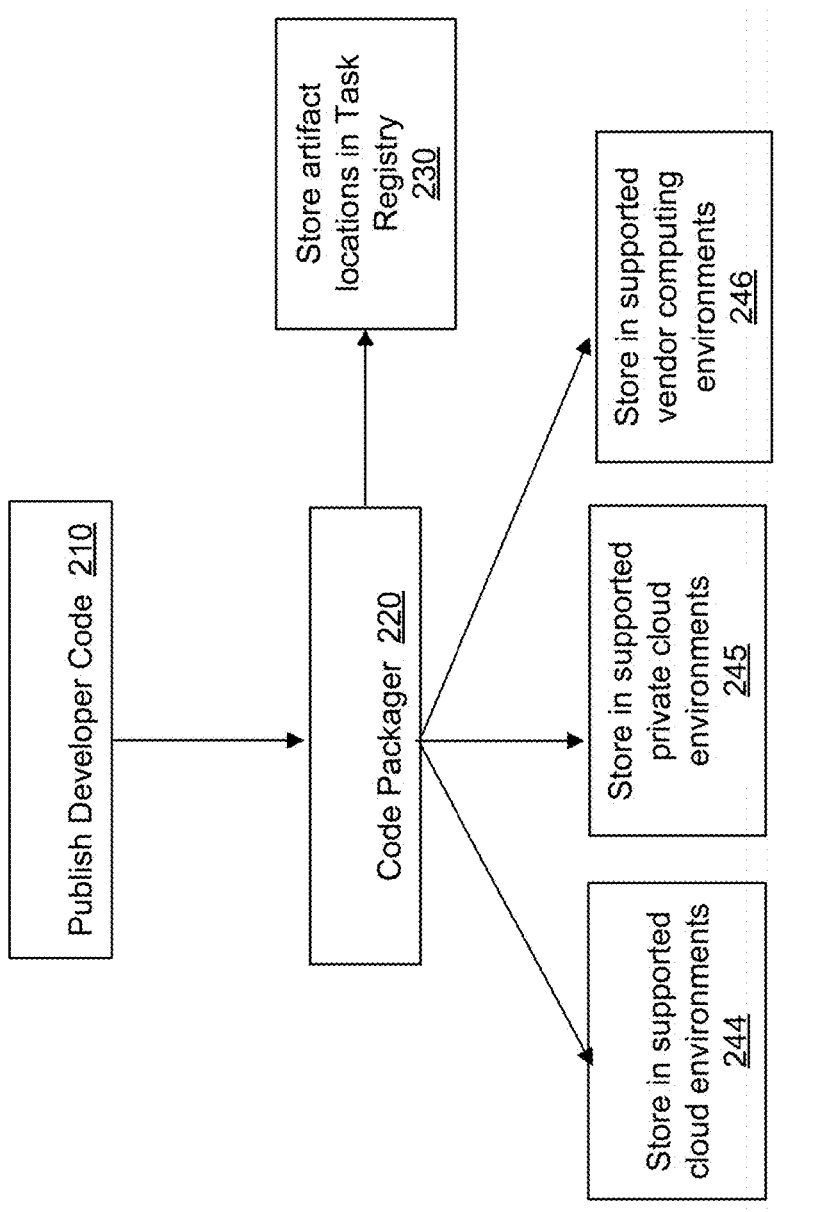
FIG. 2 is a flow diagram illustrating the manner in which tasks to be reused in production pipelines are published according to one or more aspects of the various embodiments.

FIG. 2 is a flow diagram illustrating the manner in which tasks to be reused in production pipelines are published according to one or more aspects of the various embodiments. At block 210, a developer publishes code associated with a particular task. The code can be developed and published in the cloud or any of the other computing environments. In some embodiments, the authoring environment can be the cloud computing environment. For example, the developer may be working in the same cloud computing environment as the orchestrator module 121. In other embodiments, the developer can author the code in any one of the various computing environments illustrated in FIG. 1.

At block 220, a code packager can package the code in accordance with the requirements of each of the various computing environments. While not shown in FIG. 1, a code packager can be included in the authoring environment. For example, the orchestrator module 121 can include the code packager if the authoring environment is the public cloud on which the orchestrator module 121 is implemented. Alternatively, the code packager can be included in any of the various computing environments. In some implementations, the code packager may be part of the executor modules 124.

Regardless of the authoring environment, the user code is packaged for each of the supported environments. For example, the code may be packaged differently for each of the environments (e.g., the orchestrator module 121, the data centers 125, the private clouds 130, the vendor compute environments 135). Cloud computing environments may, for example, need a different packaging than non-cloud environments. Packaging may also be different between various cloud environments. By packaging code differently for each of the environments, the hybrid task execution framework prevents code authors from needing to be concerned about these differences.

At block 230, the code artifact locations are stored in the task registry (e.g., task registry 123 of FIG. 1). If the authoring environment is separate from the cloud computing environment of the orchestrator module 121, the artifact locations are uploaded to the task registry 123 from the authoring environment. Code artifacts can include compiled code, setup scripts, test suites, generated objects and logs generated during testing and quality assurance, and other metadata associated with the compiled code. The task registry 123 comprises a list of the various tasks that may be executed as part of the hybrid task execution framework and the metadata related to each task. Among other things, the task registry stores the user provided function name, arguments or parameters associated with each task and the locations of the packaged code.

In some embodiments, the task registry comprises multiple registries, where each registry is associated with a different computing environment. Each task gets published to a respective one or more of the multiple registries associated with the respective computing environment. For example, an executor module 124(3) associated with a cloud environment will expect the task related metadata to be in a registry specific to the private cloud environment. Similarly, an executor module 124(4) associated with a vendor computing environment will expect the task related metadata to be in a registry specific to the vendor computing environment. In this way, the task registry 123 comprises separate registries for each of the computing environments a particular task is packaged for, where each registry comprises information (including artifact locations) specific to the respective computing environment.

At block 244, the code packages created for cloud-computing environments are stored in the supported cloud computing environments. At block 245, the code packages created for private cloud-computing environments are stored in the supported private cloud computing environments (e.g., environments associated with the data center(s) 125 or the private cloud(s) 130). At block 246, the code packages created for vendor computing environments are stored in the appropriate vendor computing environments (e.g., vendor compute environment(s) 135). It should be noted that blocks 244, 245 and 246 are not meant to be limiting in any way. A separate package may be created for each of the computing environments and stored in a storage location associated with a respective computing environment.

Figure 3:
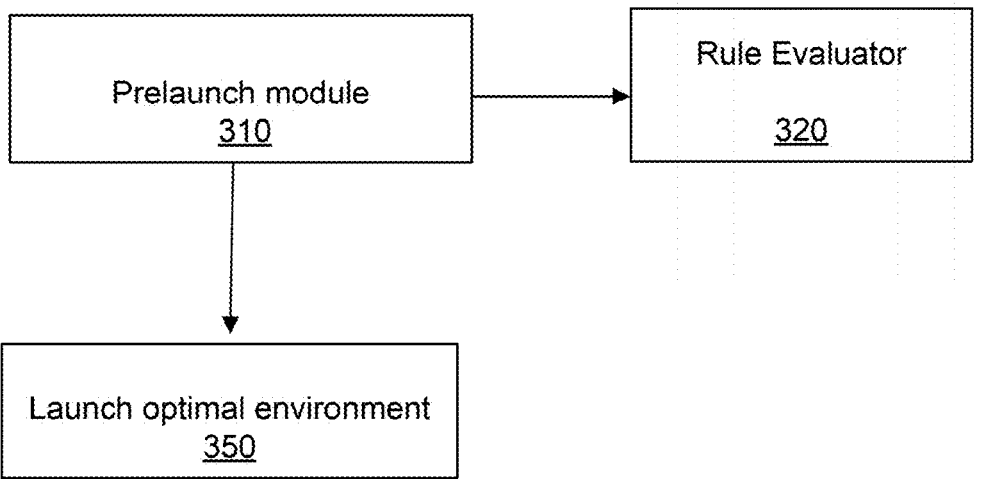
FIG. 3 is a flow diagram illustrating the manner in which a prelaunch module determines the optimal computing environment in which to execute a task according to one or more aspects of the various embodiments.

FIG. 3 is a flow diagram illustrating the manner in which a prelaunch module determines the optimal computing environment in which to execute a task according to one or more aspects of the various embodiments. As noted above, the tasks associated with the pipelines 151 can run in heterogeneous environments and, in some situations, more than one compute environment may be able to execute a particular task. In some embodiments, the prelaunch module 310 (which performs substantially the same functions as prelaunch module 134) is programmed to place and execute a task in the most optimal of the available compute environments based on several factors. For example, after each task is executed by a pipeline 151 in FIG. 1, the prelaunch module 134 may be configured to determine the most optimal computing environment for the next task that needs to be executed as part of the respective pipeline.

The prelaunch module 310 uses a rule evaluator 320 to determine the most optimal compute environment based on several factors. These factors include availability of computing resources, cost and efficiency benefits, storage-related concerns and network bandwidth needs. Based on the factors and the rules, a score is computed for each of the computing environments. The prelaunch module 310 uses these scores to determine the most optimal environment in which to execute the code. In some embodiments, the rules to calculate the score are dynamic and accordingly a rule evaluator 320 is employed. At block 350, the prelaunch module 310 launches the optimal computing environment, based on the computed score, in which to execute the task.

In some embodiments, the task execution can be split across more than one computing environment. For example, where two computing environments have the same score, the data for the task can be split across two environments and the task can be executed in parallel across both environments to optimize for speed.

Figure 4:
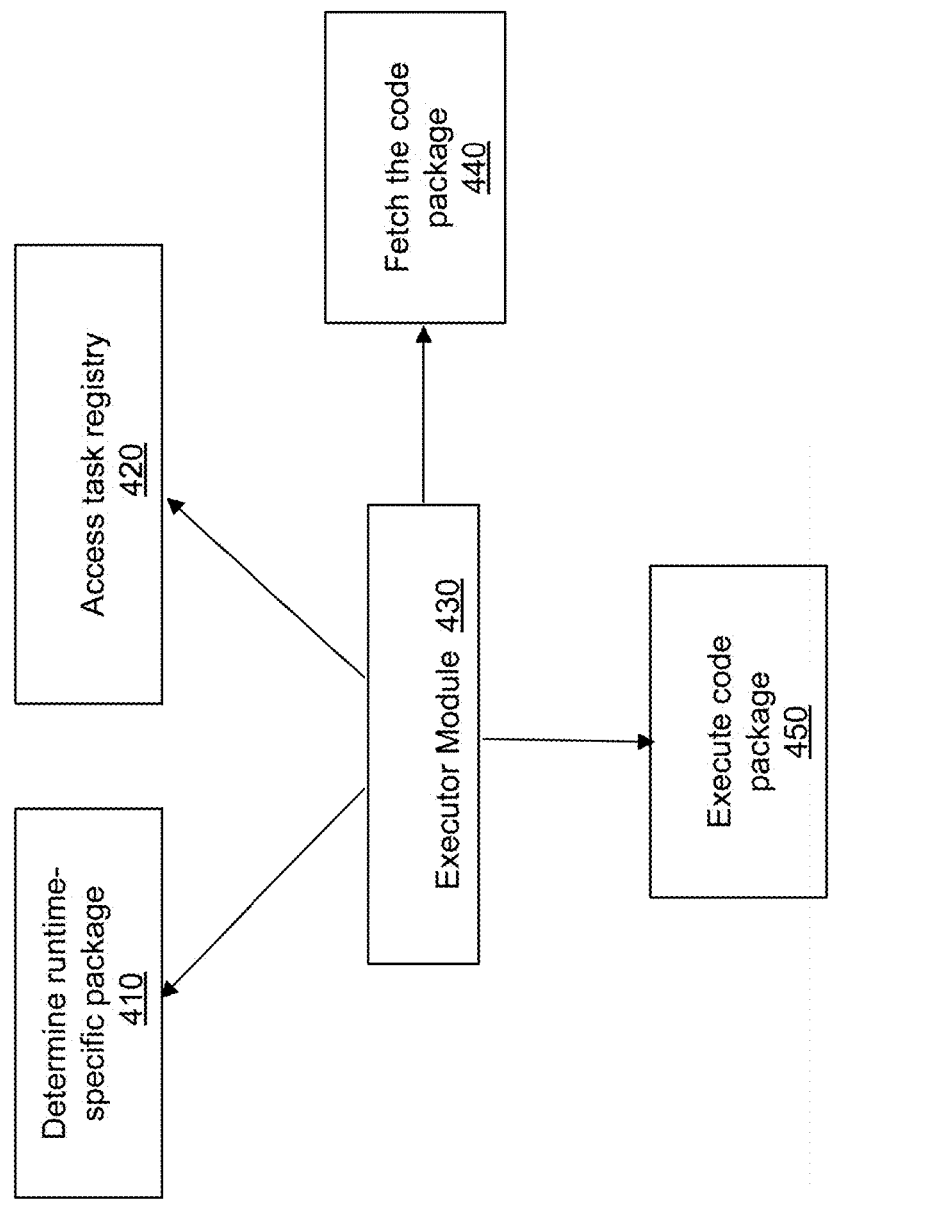
FIG. 4 is a flow diagram illustrating the manner in which tasks are retrieved and executed in one of the various computing environments according to one or more aspects of the various embodiments

FIG. 4 is a flow diagram illustrating the manner in which tasks are retrieved and executed in one of the various computing environments according to one or more aspects of the various embodiments. At block 410, when a task is to be executed in a particular computing environment, an executor module 430 (which performs substantially the same function as an executor module 124 in FIG. 1) associated with that environment determines the runtime-specific package (as packaged by the code packager 220 of FIG. 2) associated with the task. In other words, the executor module 430 resolves the most appropriate package for that particular environment at block 310. In some embodiments, the executor module 124 associated with a given computing environment can access the prelaunch module 134 to determine whether the given computing environment is associated with the highest score.

In some embodiments, a pipeline 151 can be configured to indicate in which computing environment a task should be executed. For example, a pipeline 151 may be configured to indicate that one of the tasks of the pipeline should be executed in a vendor computing environment 135. Alternatively, as explained above, the decision of which environment a task executes in can be rule-based. The prelaunch module 134 of the executor module 124(1) can be programmed with the intelligence to determine, based on one or more rules (e.g., rules regarding where the files for a particular task are located, the compute costs of running in a particular environment, etc.), whether a particular task would be best executed in a particular computing environment. For example, the prelaunch module 134 could indicate that a particular task would be best executed in a vendor computing environment 135 or in a private cloud 130. In some embodiments, the prelaunch module 134 may consult the task registry 123 and execute one or more rules based on the information in the task registry 123 to determine the most optimal computing environment for a particular task.

Thereafter, at block 420, the executor module 430 retrieves the task package using information in the task registry (e.g., task registry 123 in FIG. 1). The task registry maintains information regarding the mapping associated with a given task. For example, the task registry holds references to all the registries to which the task has been published. The task registry may also include mapping information regarding which of the executor modules 124 is the preferred executor for a particular task. It can also maintain other metadata associated with a task such as the code that needs to execute, the location of the code, the location of other artifacts specific to the task and the arguments to the specific routines comprising the task. For example, the task registry can indicate that the code and the metadata for a particular task that needs to execute as part of the pipeline is located in a vendor's computing environment (e.g., vendor compute environment(s) 135 in FIG. 1).

In some embodiments, the task registry (e.g., task registry 123 in FIG. 1) may also track code versions. For example, when a given executor module 124 accesses the task registry 123 to retrieve code locations for a particular task, the task registry 123 can re-direct the executor module 124 to the latest version of the code associated with the task. In some embodiments, the given executor module 124 may need to run an older version of the code in which case it can retrieve the older version using the information in the task registry 123.

Depending on the environment, the process of running a package may vary. For non-cloud environments, for example, a code image can be downloaded locally and initiated with the user code as the entry point. Other environments (e.g., container-based management systems) may automatically boot up the task code given a code image tag that is included in a task registry.

At block 440, the executor module 430 fetches the code package from the location corresponding to the information provided by the task registry 123 and the task library 170. Thereafter, the code package is executed at block 450 by the executor module 430.

Figure 5:
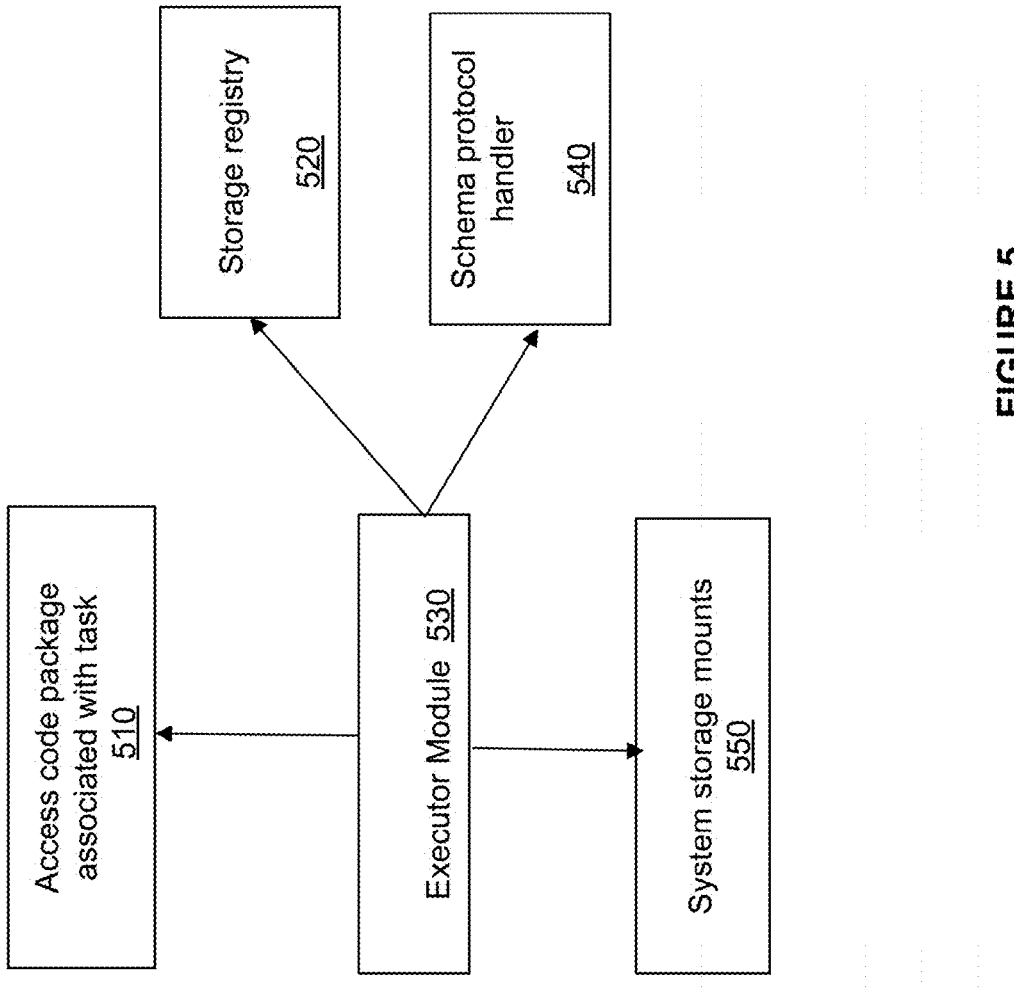
FIG. 5 is a flow diagram illustrating the manner in which storage is abstracted for the various computing environments according to one or more aspects of the various embodiments.

FIG. 5 is a flow diagram illustrating the manner in which storage is abstracted for the various computing environments according to one or more aspects of the various embodiments. Abstraction of storage is one of the core functionalities of hybrid task execution framework enabled by the executor modules 124. Depending on the specific compute environment, the storage access patterns differ. With its dynamic storage capability, the hybrid task execution framework abstracts the storage requirements, thereby, making sure that the storage locations and devices the user code depends on are available automatically.

At block 510, an executor module 530 accesses the appropriate user code associated with the task. As noted previously, the prelaunch module 134 may have already determined the appropriate computing environment for executing the task using a rule-based determination (as discussed in connection with FIG. 3). Before yielding control to the user code, the executor module 530 inspects the user code for storage access. The executor module 530 analyzes the data to be read by the user code as well as any data to be written out by the code.

At block 520, the executor module 530 initiates the environment specific operations to make the storage devices available. More specifically, the executor module 530 consults the storage registry associated with the specific compute environment to determine the availability of the requested storage in the given environment. For data to be read by the user code associated with the task, the executor module 530 mounts the data to the computing environment in which the task is supposed to execute for local access. In order to retrieve the data, for example, the executor module 530 may need to access other computing environments. Meanwhile, for any data written out, the executor module 530 writes back the data to the corresponding storage system.

At block 540, the executor module 530 invokes the appropriate schema protocol handler. Each scheme maps to a distinct storage protocol. Each scheme is associated with a protocol that conveys to the executor environment information regarding the system with which each of the files needed for a given task are associated. Based on the scheme, the executor module 530 invokes a protocol handler that is capable of handling that scheme. For example, local file references (e.g., using "file://" scheme) directly use the system file operations, while cloud storage schemes such as "s3://" or "cdrive://" will result in the file being downloaded locally for inputs and uploaded and written back for outputs using the appropriate protocol handler.

In some embodiments, the executor module 530 abstracts storage by relying on a structured storage specification. For example, all storage references can use a uniform resource identifier (URI).

By way of example, a URI can have the following structure: scheme://root-reference@/path-relative-to-root?parameters1=value1&parameter2=value2

The URI structure can be used to allow a task to access files regardless of where they are stored, whether locally or remotely. In the above URI structure, "scheme" defines the manner in which a certain storage item can be accessed. For instance, a cloud object stored in an AMAZON S3 storage service can use "s3" as the schema. A file or a folder on a POSIX (Portable Operating System Interface) file system would use "file" as the scheme.

Further, in the above URI structure, "root reference" and "relative path" together identify a specific stored entity. Depending on the type of storage the root reference or the relative path may be optional. For a POSIX-type file system the root reference could be used to refer to a specific storage device such as a network storage device and the relative path is the path of a specific entity on that device. For a cloud object store, the root reference could be a universal unique identifier (UUID) that refers to a folder and the relative path, for example, the path of a child entity relative to that folder.

The parameters component of the above URI structure is a set of attribute and value pairs that allow for passing information about scheme specific extensions. For example, the parameters component of the URI can be used in situations when a cloud storage is referenced and conveys the manner in which the storage items need be made available on a local file system.

Finally, at block 550, the executor module 530 mounts the appropriate storage on the associated compute environment. Once the appropriate storage is mounted, the files needed for a given task are made available for the particular environment in which the task executes. The executor module 530 can then yield to the user code which can access the device. When the user code completes execution, the executor module 530 can resume control and perform any write operations.

FIG. 6 is a flow diagram of method steps for launching a task associated with a content production pipeline in an optimal non-native computing environment, according to various embodiments of the present invention. Although the method steps are described with reference to the systems of FIGS. 1-5, persons skilled in the art will understand that any system configured to implement the method steps, in any order, falls within the scope of the present invention.

As shown, a method 600 begins at step 602, when user code is published associated with a task (e.g., at block 210 of FIG. 2). The task may be one of a plurality of tasks associated with a content creation pipeline (e.g., pipeline(s) 151) configured within an orchestrator module 121. The orchestrator module 121 provides the tools necessary to configure one or more content creation pipelines that allows multiple users spread geographically to collaborate on a content creation project.

At step 604, the user code is packaged separately for each of a plurality of computing environments by the code packager 220 discussed in connection with FIG. 2. Each code packager packages the user code so as to enable the user code to execute within the respective computing environment with no modification to the user code. As discussed in FIG. 2, each of the packages is stored in the corresponding computing environment (e.g., as shown at blocks 244, 245 and 246 of FIG. 2).

At step 606, artifact locations associated with the user code for each of the plurality of computing environments are stored in a task registry 123 (e.g., as shown at block 230 of FIG. 2). As discussed previously, the task registry 123 can contain multiple registries, where each registry corresponds to one of the computing environments. Furthermore, user code for each task can be associated with one or more registries.

At step 608, responsive to the task being selected for execution during an execution of the content creation pipeline, determining, based on a set of rules, a computing environment from the plurality of computing environments in which to execute the task. For example, as shown in FIG. 3, the prelaunch module 310 consults a rule evaluator at block 320, to execute one or more rules and to compute a score for each of the computing environments.

At step 610, the prelaunch module 310 launches the computing environment (e.g., at block 350 of FIG. 3) that was determined in accordance with the set of rules. For example, the computing environment with the highest computed score may be launched.

At step 612, the task is executed in the computing environment determined in accordance with the set of rules.

Prioritized Polling Scheme

As discussed above, another significant challenge encountered by generalized content production processes is the complexity of prioritizing local compute resources. In processing pipelines where collaborators utilize a mix of cloud-based and localized resources, it becomes crucial to adjust the priority of scheduled jobs to ensure optimal pipeline efficiency, especially in circumstances were computing resources are not unlimited. However, existing generalized content production processes lack an efficient method to recompute the priority of jobs on-the-fly and dynamically update their order accordingly. This limitation hinders the seamless and effective allocation of resources, affecting the overall productivity of the production process.

An initial method for addressing the challenge of reprioritizing local compute resources is to initiate jobs based on their predefined priority sequence. Nevertheless, this tactic quickly proves insufficient when the operator must adjust the priority of jobs that are already in the scheduling queue. While one potential strategy to tackle this problem involves recalculating the priority of ongoing jobs using the revised prioritization criteria and subsequently reconstructing and filling a queue with the priority of existing scheduled jobs, it is important to acknowledge a notable drawback of this approach. The concern lies in the introduction of a temporal lag between the modification of prioritization rules and the actual implementation of these rules. Achieving real-time rule transition presents a formidable hurdle.

In some embodiments, a distributed queueing system can be used to manage tasks associated with a content creation pipeline 151, where the tasks may execute in the cloud or in a localized set of servers (e.g., in a private cloud 130 or a vendor compute environment 135). For tasks that are supposed to execute in a cloud computing environment, autoscaling capabilities provided by a provider entity of the cloud computing services can be used to handle burst scenarios where the number and priority of tasks escalate suddenly. The same autoscaling capabilities cannot be employed for tasks that need to run on local servers (e.g., non-cloud computing environments) because of the dependency on local resources. The local resources typically need to be allocated using a prioritization process before being selected for execution because local compute infrastructure typically has a fixed capacity.

Administrators overseeing the local compute framework in accordance with the disclosed techniques retain the authority to modify priority rules even after job scheduling for local compute resources. This dynamic adaptability ensures that the system remains aligned with evolving operational needs. Moreover, curtailing the temporal gap between changes made to priority rules and their actual implementation is imperative. This minimization of delay is vital, as unchecked non-prioritized tasks could potentially saturate the local compute infrastructure, necessitating the intricate and error-prone task of terminating these non-prioritized jobs. Furthermore, recovering these manually terminated tasks, especially when local compute resources subsequently become available is impractical.

In essence, the disclosed techniques enable a balanced orchestration of cloud and local server executions that considers both autoscaling dynamics and the intricacies of local resource dependencies. This equilibrium hinges on a flexible priority framework and a prompt transition of rule adjustments, culminating in an efficient, optimized, and error-resilient job management ecosystem.

Figure 7:
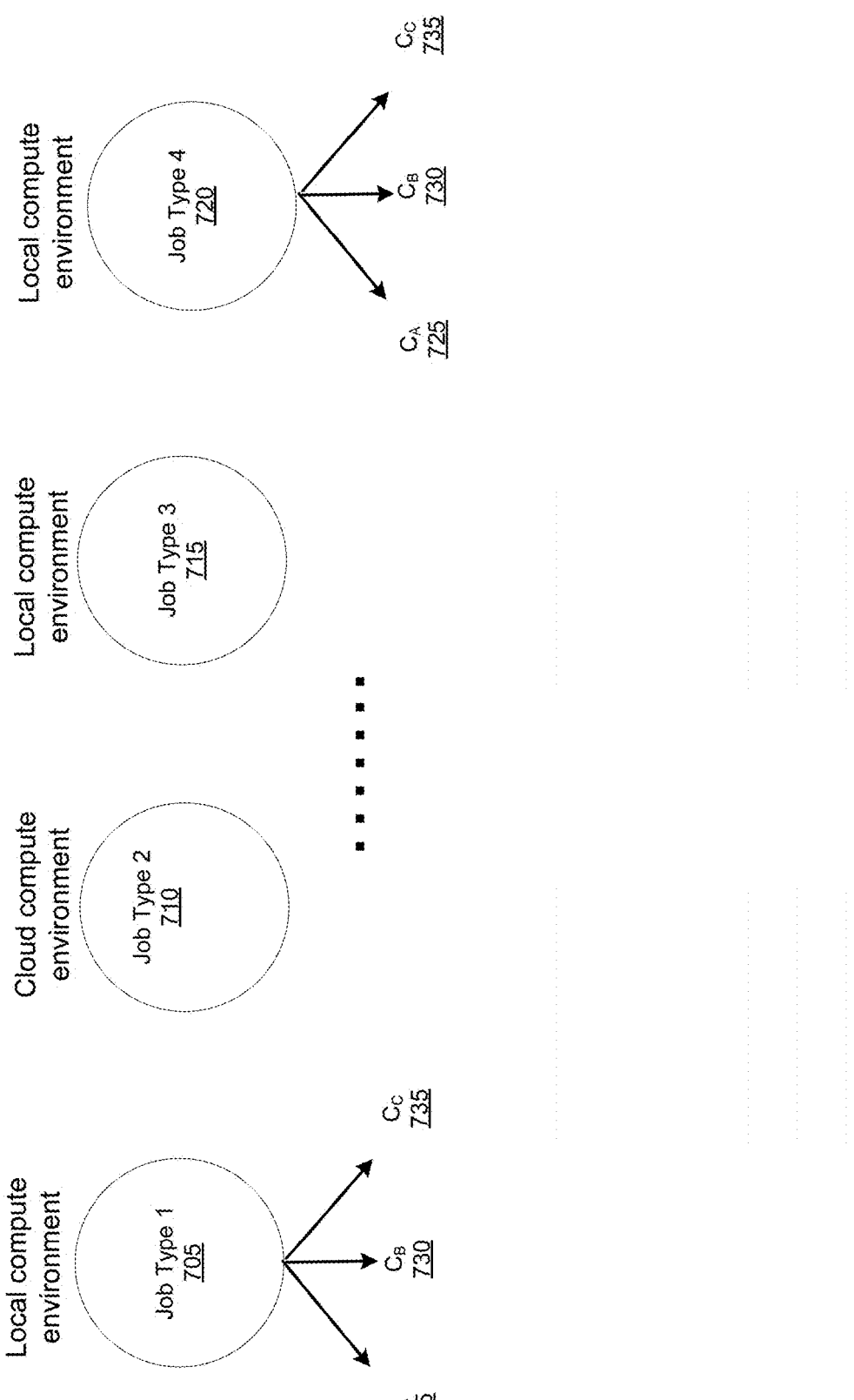
FIG. 7 illustrates an example of jobs scheduled in a distributed queuing system, according to various embodiments of the present invention.

FIG. 7 illustrates an example of jobs scheduled in a distributed queuing system, according to various embodiments of the present invention. As shown in FIG. 7, a task that executes as part of a content creation pipeline can be associated with one or more jobs (e.g., job type 1 705, job type 2 710, job type 3 715, job type 4 720, etc.). Job types in the distributed queuing system can either be associated with local compute environments or cloud computing environments. In some embodiments, each job type may be associated with a respective computing environment. In other embodiments, a single computing environment can also be associated with more than one job type.

In some embodiments, each job type can be associated with one or more constraint types (e.g., constraint CA 725, constraint CB 730, constraint CC 735, etc.). In some embodiments, each constraint type is associated with a value (e.g., CA1, CA2, CA3, CB1, CB2, CB3, CC1, CC2, CC3, etc.) Note that while only a limited number of job types and constraints are illustrated in FIG. 7, there can be an N number of job types in the distributing queueing system implemented in accordance with the disclosed techniques, where each job type may be associated with an M number of constraint types. Furthermore, each constraint type can be associated with an O number of values. Each job type can be tagged with respective constraint types and values associated with the job type before inserting the job type in the queue.

In the example of FIG. 7, consider that the same priority of jobs is as follows: Job Type 1>Job Type 2>Job Type 3>Job Type 4. Further, consider that the sample priority order of constraint types is as follows: CA>CB>CC. Also, consider that the sample priority order of constraint values is as follows: 1>2>3. So for example, the following would be an illustrative priority order of constraint values for constraint A: CA1>CA2>CA3.

In some embodiments, each job is tagged with a job type and one or more constraint types (including associated values) before adding the job to the distributed queueing system. Priority rules are defined for the constraint types that are associated with each job. In some embodiments, the distributed queuing system is managed and orchestrated centrally by the orchestrator module 121 of FIG. 1. For example, the executor module 124(1) can centrally manage the distributed queueing system. In some embodiments, the executor module 124(1) can poll the distributed queuing system with the execution destination. For example, the executor module 124(1) actively monitors the distributed queuing system to identify tasks that need to be executed and determines where each task should be run (the execution destination) using the prelaunch module 134. This process helps ensure efficient allocation of tasks across the distributed system's resources.

In some embodiments, the distributed queueing system addresses the challenge of real-time update of prioritization rules in distributed queueing systems by splitting up the responsibility of dequeuing and prioritization to two separate stages or application layers. In some embodiments, the first layer is responsible for queuing and dequeuing jobs from the queue. In some embodiments, the first layer also supports attaching constraint name and value pairs to the jobs in the queue using predefined constraint parameters during the queuing process and further supports filtering on the constraint parameters. By comparison, generalized queuing systems do not support filtering and dequeuing as an atomic operation.

In some embodiments, the first layer can filter the distributed queue for one or more constraints. In other words, the first layer can support filtering for either a single constraint or multiple constraints during the dequeuing process. However, filtering for multiple constraints can add an additional level of complexity and, therefore, is more costly and time-consuming. Accordingly, in some embodiments, in addition to the job type, the first layer supports filtering jobs using a single constraint.

In order to support filtering using the job type and a single constraint, the various constraint types (e.g., CA, CB, CC, etc.) and associated values are mapped to a single constraint, which may be referred to as a correlation identifier. The correlation identifier uniquely represents the aggregate priority of each job instance. For example, the correlation identifier can be associated with a particular numeric or alphanumeric value to enable efficient filtering. Using a single constraint in the form of a correlation identifier optimizes for cost and time-savings.

Figure 8:
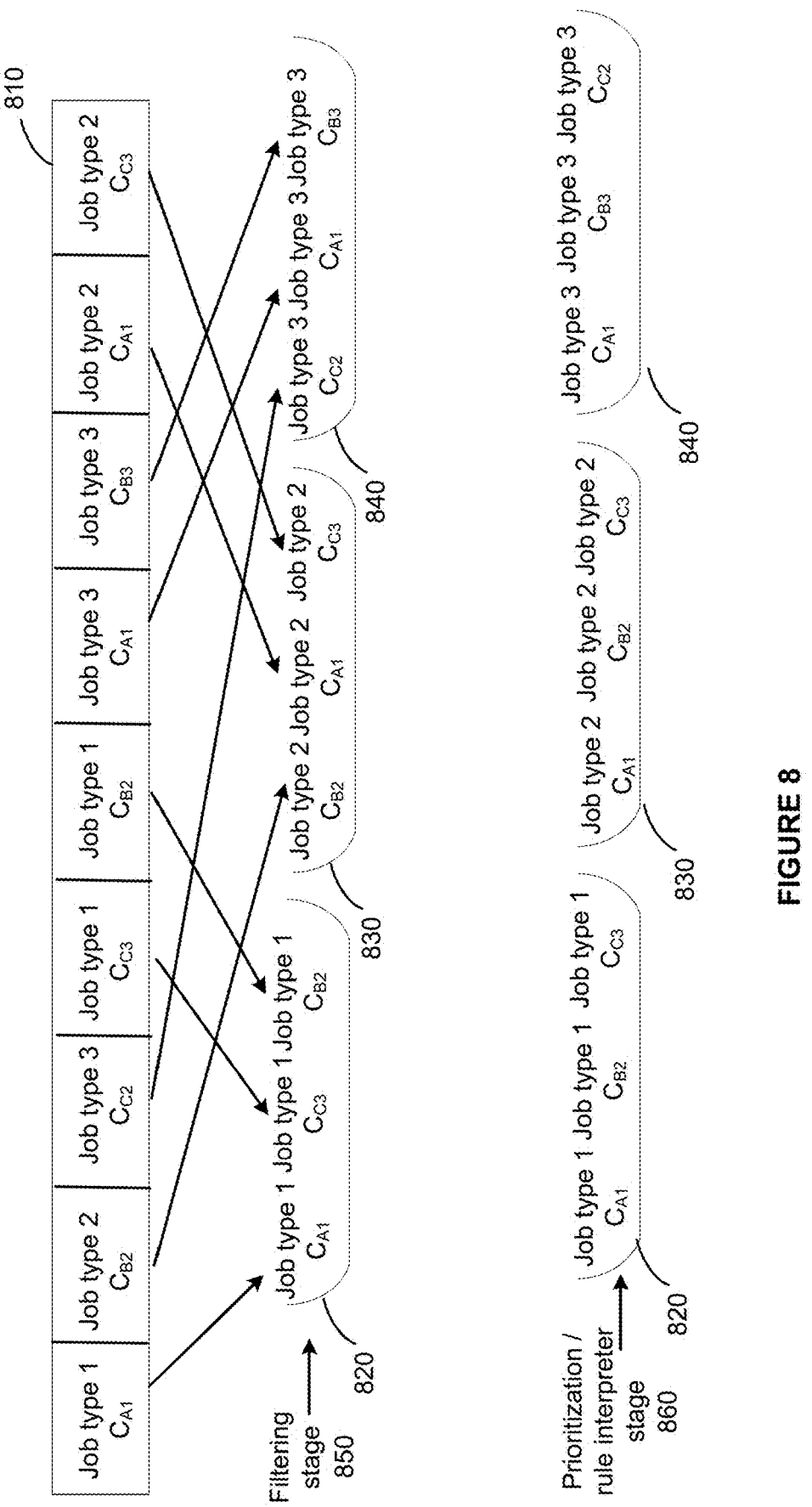
FIG. 8 illustrates an example of the manner in which the distributed queuing system performs dequeuing and prioritization using separate layers, according to various embodiments of the present invention.

FIG. 8 illustrates an example of the manner in which the distributed queuing system performs dequeuing and prioritization using separate layers, according to various embodiments of the present invention. FIG. 8 depicts a distributed queue 810, which is conceptually shown as a traditional queue for simplicity. However, in a real-world implementation, the distinct tasks represented within queue 810 might actually be distributed across diverse data structures within multiple computing environments.

As discussed above, in some embodiments, the filtering stage 850 can filter the jobs in queue 810 by the job type and a single constraint. For example, a call invocation to the distributed queueing system may request three job instances for each of job types 1, 2, and 3 with the highest priority. Each of constraints A, B or C and associated values can be mapped to a correlation identifier, which can be easily filtered for as a single constraint by filtering stage 850. In this example, constraint types A, B or C will have higher correlation identifier values as compared to other constraints (e.g., additional constraints D, E, F, etc. not shown in FIG. 8). Accordingly, as shown in FIG. 8, the filtering stage 850 creates three buckets, one for each of job types 1, 2 and 3 (e.g., bucket 820 associated with job type 1, bucket 830 associated with job type 2 and bucket 840 associated with job type 3). Each bucket is populated with job instances with associated constraints that correspond to the highest correlation identifier values, namely, constraints A, B and C.

In some embodiments, after the filtering stage extracts the job instances queried using the relevant job types and the appropriate correlation identifiers, a second prioritization and rule interpreter stage 860 layer interprets the prioritization rules associated with the constraints. In some embodiments, the second layer creates dynamic comparator functions that are applied to the job instances to create a sorted list. The dynamic comparator functions can be used to create a sorted list using the correlation identifiers or any additional constraints that may be associated with the relevant job types. Furthermore, the second layer is also able to interpret and apply any prioritization rules associated with the various constraints to determine the correct sort of the job instances. The second layer is responsible for emitting (also referred to as transmitting) the job instances from the buckets in the appropriate sorted order. As shown in FIG. 8, for example, the layer 860 sort the job instances in each of the buckets in correct order of priority. For example, the job instances in bucket 820 are sorted in the following correct order of priority: CA1, CB2, CC3.

As noted above, the distributed queueing system addresses the challenge of real-time update of prioritization rules in distributed queueing systems by splitting up the responsibility of dequeuing and prioritization to two separate stages or layers Performing both functions in a single layer is not pragmatic as it would culminate in a singular, integrated monolithic system. The foundational layer (Layer 1) embodies a queuing architecture with proficiency in atomic dequeue operations, yet is not programmed with the intricate logic underlying prioritization directives. Furthermore, it warrants noting that distributed queuing systems can typically support high throughput, low latency atomic dequeue operations when constraints sizes are small. Accordingly, as noted above, the first layer is programmed to filter using the job instance and a single constraint. Decoupling the second layer from the first layer yields benefits, as it allows the second layer to execute prioritization rules and additional constraints to methodically arrange the job instances prefiltered by the first layer, all without introducing any performance bottlenecks to the system.

In some embodiments, changing the priority of the job instances in the distributed queueing system on-the-fly comprises changing the constraint and/or associated value that is tagged on to a given job instance. Changing the constraint dynamically results in a job instance being mapped to a different correlation identifier with a different aggregate priority. The filtering stage can then filter based on the newly assigned correlation identifier values without needed to change the order of the queue. Alternatively, the priority rules or values associated with the constraints can also be changed, which allows the second layer to sort the job instances at the second stage based on the updated rules or values.

FIG. 9 is a flow diagram of method steps for implementing a prioritized polling scheme for a distributed queueing system comprising job instances associated with a content creation pipeline, according to various embodiments of the present invention.

As shown, a method 900 begins at step 902, when a distributed queue (e.g., queue 810 in FIG. 8) is populated with a plurality of job instances, where each job instance is tagged with a job type, a constraint type and an associated constraint value. As noted previously, each constraint type can be associated with one or more rules.

At step 904, each constraint type and associated constraint value is mapped to a unique correlation identifier. The correlation identifier uniquely represents the aggregate priority of each job instance.

At step 906, responsive to a call invocation to the distribute queue to return job instances associated with a particular job type and a particular constraint type in order of priority, a filtering operation is performed to dequeue job instances with the particular job type identified in the call invocation and a correlation identifier corresponding to the particular constraint type and associated value.

At step 908, for the dequeued job instances associated with the particular job type, the dequeued job instances are sorted based on rules associated with the particular constraint types. In some embodiments, the second layer creates dynamic comparator functions that are applied to the job instances to create a sorted listed. The dynamic comparator functions can be deployed to sort using the correlation identifiers, constraint values or other additional constraints associated with the job instances. In some embodiments, additional constraint types associated with the particular job type may also be used to perform further sorting. Furthermore, any additional rules associated with any of the additional constraint types may also be interpreted and executed for performing the sorting.

At step 910, the dequeued job instances are emitted in a sorted order in accordance with the call invocation.

Figure 10:
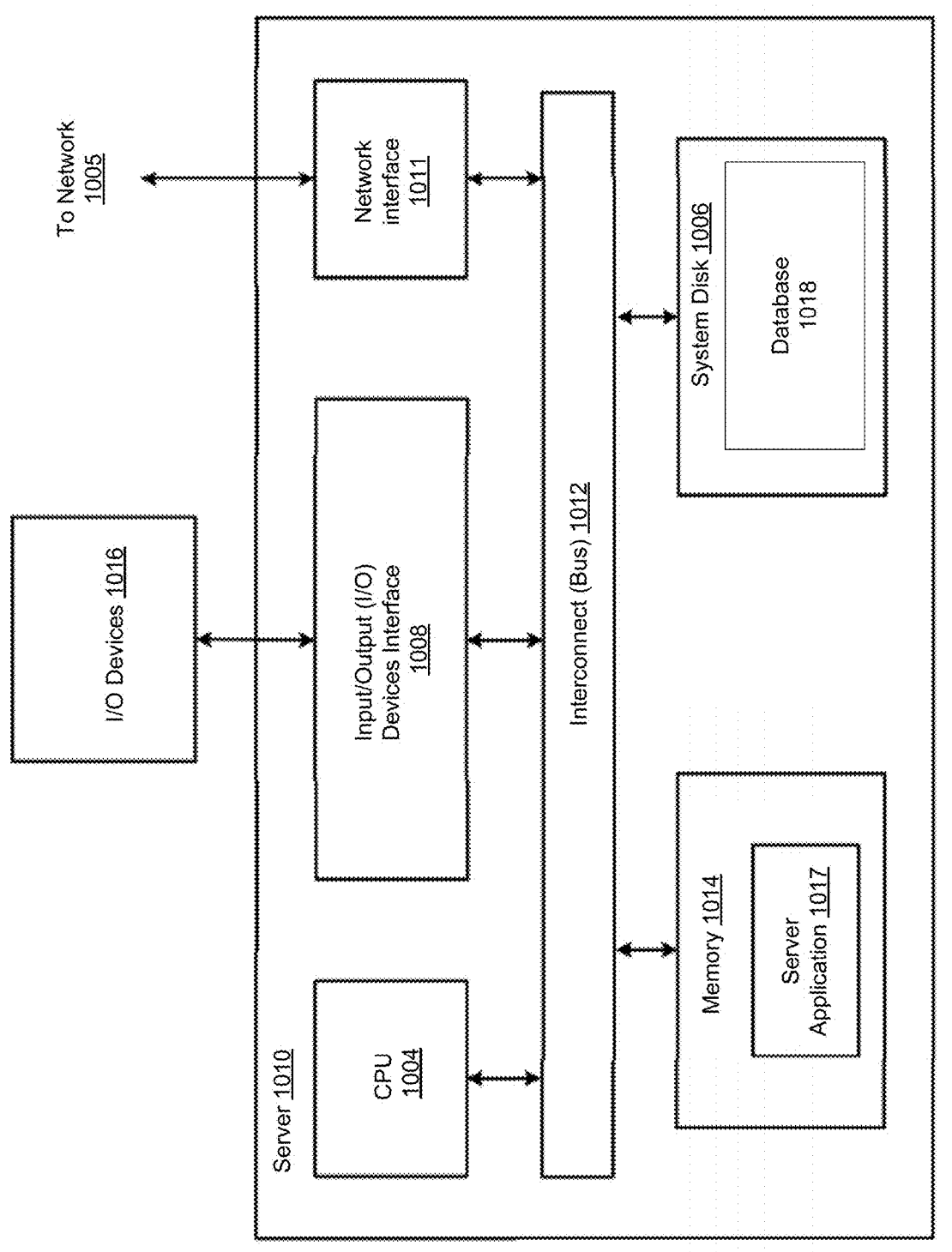
FIG. 10 is a block diagram of a server 1010 that may be implemented in conjunction with system 100 of FIG. 1, according to various embodiments of the present invention.

FIG. 10 is a block diagram of a server 1010 that may be implemented in conjunction with system 100 of FIG. 1, according to various embodiments of the present invention. Each of the services 102, 130 and 140 can be implemented on or across one or more of the servers 1010 shown in FIG. 10. As shown, the server 1010 includes, without limitation, a central processing unit (CPU) 1004, a system disk 1006, an input/output (I/O) devices interface 1008, a network interface 1011, an interconnect 1012, and a system memory 1014.

The CPU 1004 is configured to retrieve and execute programming instructions, such as server application 1017, stored in the system memory 1014. Similarly, the CPU 1004 is configured to store application data (e.g., software libraries) and retrieve application data from the system memory 1014. The interconnect 1012 is configured to facilitate transmission of data, such as programming instructions and application data, between the CPU 1004, the system disk 1006, I/O devices interface 1008, the network interface 1011, and the system memory 1014. The I/O devices interface 1008 is configured to receive input data from I/O devices 1016 and transmit the input data to the CPU 1004 via the interconnect 1012. For example, I/O devices 1016 may include one or more buttons, a keyboard, a mouse, and/or other input devices. The I/O devices interface 1008 is further configured to receive output data from the CPU 1004 via the interconnect 1012 and transmit the output data to the I/O devices 1016.

The system disk 1006 may include one or more hard disk drives, solid state storage devices, or similar storage devices. The system disk 1006 is configured to store a database 1018 of information (e.g., the system disk 1006 can store a non-volatile copy of the entity index that is loaded into the memory 1014 on system startup). In some embodiments, the network interface 1011 is configured to operate in compliance with the Ethernet standard.

The system memory 1014 includes a server application 1017. For example, when the server application 1017 receives a query, the server application 1017, in some embodiments, can determine a response to the query using predicate bitsets also stored in the memory 1014. Also the server application 1017 can access an entity index also stored in the memory 1014 to decode a bitset. For explanatory purposes only, each server application 1017 is described as residing in the memory 1014 and executing on the CPU 1004. In some embodiments, any number of instances of any number of software applications can reside in the memory 1014 and any number of other memories associated with any number of compute instances and execute on the CPU 1004 and any number of other processors associated with any number of other compute instances in any combination. In the same or other embodiments, the functionality of any number of software applications can be distributed across any number of other software applications that reside in the memory 1014 and any number of other memories associated with any number of other compute instances and execute on the processor 1010 and any number of other processors associated with any number of other compute instances in any combination. Further, subsets of the functionality of multiple software applications can be consolidated into a single software application.

In sum, the disclosed techniques may be used for implementing a task associated with a content creation pipeline in various computing environments. The method includes publishing user code associated with a task included in a content creation pipeline, wherein the task is one of a plurality of tasks associated with the content creation pipeline, wherein the content creation pipeline is configured in a cloud computing environment, and wherein tasks associated with the content creation pipeline can execute in a plurality of computing environments. The method further includes packaging the user code separately for each of the plurality of computing environments, wherein each package enables the user code to execute within the respective computing environment with no modification to the user code. Additionally, the method includes storing artifact locations associated with the user code for each of the plurality of computing environments in a task registry. Responsive to the task being selected for execution, the method includes determining, based on a set of rules, a computing environment from the plurality of computing environments in which to execute the task. The method also includes launching the computing environment in accordance with the set of rules and executing the task in the computing environment using the artifact locations from the task registry.

In sum, the disclosed techniques may be used for implementing a prioritized polling scheme for a distributed queueing system comprising job instances associated with a content creation pipeline. The method includes populating a distributed queue with a plurality of job instances, wherein each job instance is tagged with a job type, a constraint type and an associated constraint value, and wherein the constraint type can be associated with one or more rules. Further, the method includes mapping each constraint type and associated constraint value to a unique correlation identifier value, wherein the unique correlation identifier value represents an aggregate priority of a corresponding job instance. Responsive to a call invocation to the distributed queue to return job instances associated with a particular job type and a particular constraint type in priority order, the method includes performing a filtering operation to dequeue job instances with the particular job type identified in the call invocation and a correlation identifier corresponding to the particular constraint type identified in the call invocation. Additionally, the method includes sorting the dequeued job instances based on rules associated with the particular constraint type. The method further includes emitting the dequeued job instances in a sorted order of priority in accordance with the call invocation.

At least one technical advantage of the disclosed techniques relative to the prior art lies in the streamlined development process for code intended to be utilized in multiple diverse environments within a content production pipeline. Through the novel approach of packaging code developed for various tasks involved in the production process, these techniques enable seamless execution of tasks on different platforms, irrespective of their specific operating requirements. As a result, developers can now concentrate solely on enhancing the functionality and quality of their code without being burdened by the necessity to ensure its compatibility with every platform. By leveraging the platform-agnostic nature of the disclosed techniques, developers can devote more time to the creative aspects of code development and less on troubleshooting and adjustments for each individual platform. This efficiency leads to faster code deployment, accelerated content production, and ultimately, a more streamlined and robust content production pipeline. Overall, the disclosed techniques also enhance code development by freeing developers from platform-specific constraints and infrastructure complexities, thereby empowering them to focus on innovation and creativity, all while delivering consistent and high-quality performance across diverse environments.

Moreover, the disclosed techniques offer significant advancements in the shareability and reusability of common processing tasks, thereby benefiting multiple platforms and production pipelines. For example, similar tasks are typically used when creating similar types of content (e.g., visual effects, animation, etc.). These shared tasks can now be seamlessly reused across diverse platforms and production pipelines, leading to a streamlined content creation process and reduced computational burden. By enabling the sharing and reusability of tasks, content creation becomes more efficient and expeditious. Developers no longer need to reinvent the wheel by writing code from scratch for each production process. Instead, they can leverage pre-existing, proven tasks, saving valuable time and effort. This enhanced efficiency translates into cost savings as content can now be produced more affordably, resulting in benefits for both creators and consumers. With a library of common tasks readily available, developers can focus on refining and fine-tuning the unique aspects of their content, elevating the quality and creativity of the final output.

An additional noteworthy advantage of the disclosed techniques is the capacity to significantly expedite production processes through dynamic reprioritization of computing resources on-the-fly. By enabling the system to recompute and adjust the priority of existing scheduled jobs in real-time, these techniques enhance the overall efficiency and responsiveness of the pipeline. The ability to reevaluate and adapt the prioritization of tasks dynamically leads to more optimal resource allocation, ensuring that critical or time-sensitive jobs receive the necessary computing power promptly. Conversely, less urgent tasks can be temporarily deprioritized, freeing up resources for more pressing demands. This dynamic resource management contributes to a smoother and more streamlined execution of the content production pipeline. This on-the-fly adaptability also enables the pipeline to be more resilient and responsive to changing conditions, such as unexpected surges in processing requirements or variations in workload intensity. The system can automatically adjust its priorities to maintain peak performance and maximize throughput, minimizing potential bottlenecks and reducing overall production time. Furthermore, the ability to efficiently manage computing resources translates into cost savings, as resources are utilized more judiciously, minimizing idle time and unnecessary expenditures. The disclosed techniques empower production teams to optimize their resource utilization and ensure that computational power is harnessed efficiently, ultimately leading to more cost-effective content production. Furthermore, the capability to dynamically reprioritize computing resources on-the-fly represents a fundamental improvement in the content production process. By adapting to changing demands and optimizing resource allocation, the disclosed techniques deliver expedited production timelines, heightened responsiveness, and increased cost-efficiency, thereby driving overall productivity and performance higher.

1. According to some embodiments a computer-implemented method comprises publishing user code associated with a task included in a content creation pipeline, wherein the task is one of a plurality of tasks associated with the content creation pipeline, wherein the content creation pipeline is configured in a cloud computing environment, and wherein tasks associated with the content creation pipeline can execute in a plurality of computing environments; packaging the user code separately for each of the plurality of computing environments, wherein each user code package enables the user code to execute within the respective computing environment without modification to the user code; storing artifact locations associated with the user code for each of the plurality of computing environments in a task registry; responsive to the task being selected for execution, determining, based on a set of rules, a computing environment from the plurality of computing environments in which to execute the task; launching the computing environment in accordance with the set of rules; and executing the task in the computing environment using the artifact locations from the task registry.

2. The computer-implemented method according to clause 1, wherein the plurality of computing environments comprises a cloud-computing environment, a data center, a private cloud, and a third-party computing environment.

3. The computer-implemented method according to clauses 1 or 2, wherein executing the task in the computing environment comprises accessing the task registry to retrieve artifact locations associated with the user code corresponding to the task; retrieving a code package associated with the computing environment; and executing the code package in the computing environment.

4. The computer-implemented method according to any of clauses 1-3, wherein executing the code package in the computing environment comprises accessing a storage registry associated with the computing environment to determine an availability of storage in the computing environment; mounting storage for data to be written out by an execution of the user code associated with the code package; retrieving data to be read in during the execution of the user code from one or more other computing environments; and mounting the data to be read in during the execution of the user code in a local storage environment determined using the storage registry.

5. The computer-implemented method according to any of clauses 1-4, further comprising mapping each file needed for the execution of the user code to a scheme using a protocol handler, wherein the scheme conveys information regarding an environment in which a respective file is located.

6. The computer-implemented method according to any of clauses 1-5, wherein the mapping is performed using a uniform resource identifier (URI).

7. The computer-implemented method according to any of clauses 1-6, wherein the task is selected for execution by a state machine associated with the content creation pipeline based on an event or condition occurring that is monitored by the state machine.

8. The computer-implemented method according to any of clauses 1-7, wherein the artifact locations comprise locations of compiled versions of the user code, setup scripts associated with the user code, test suites associated with the user code, generated objects associated with the user code, logs generated during testing and quality assurance associated with the user code, or other metadata associated with the user code.

9. The computer-implemented method according to any of clauses 1-8, wherein the content creation pipeline is associated with a content streaming platform.

10. According to some embodiments, one or more non-transitory computer-readable storage medium include instructions that, when executed by a processor, cause the processor to perform the steps of publishing user code associated with a task included in a content creation pipeline, wherein the task is one of a plurality of tasks associated with the content creation pipeline, wherein the content creation pipeline is configured in a cloud computing environment, and wherein tasks associated with the content creation pipeline can execute in a plurality of computing environments; packaging the user code separately for each of the plurality of computing environments, wherein each user code package enables the user code to execute within the respective computing environment with without modification to the user code; storing artifact locations associated with the user code for each of the plurality of computing environments in a task registry; responsive to the task being selected for execution, determining, based on a set of rules, a computing environment from the plurality of computing environments in which to execute the task; launching the computing environment in accordance with the set of rules; and executing the task in the computing environment using the artifact locations from the task registry.

11. The one or more non-transitory computer readable media according to clause 10, wherein the plurality of computing environments comprises a cloud-computing environment, a data center, a private cloud, and a third-party computing environment.

12. The one or more non-transitory computer readable media according to clauses 10-11, wherein the executing the task in the computing environment comprises accessing the task registry to retrieve artifact locations associated with the user code corresponding to the task; retrieving a code package associated with the computing environment; executing the code package in the computing environment.

13. The one or more non-transitory computer readable media according to clauses 10-12, wherein executing the code package in the computing environment comprises accessing a storage registry associated with the computing environment to determine an availability of storage in the computing environment; mounting storage for data to be written out by an execution of the user code associated with the code package; retrieving data to be read in during the execution of the user code from one or more other computing environments; and mounting the data to be read in during the execution of the user code in a local storage environment determined using the storage registry.

14. The one or more non-transitory computer readable media according to clauses 10-13, further comprising mapping each file needed for the execution of the user code to a scheme using a protocol handler, wherein the scheme conveys information regarding an environment in which a respective file is located.

15. The one or more non-transitory computer readable media according to clauses 10-14, wherein the mapping is performed using a uniform resource identifier (URI).

16. The one or more non-transitory computer readable media according to clauses 10-15, wherein the task is selected for execution by a state machine associated with the content creation pipeline based on an event or condition occurring that is monitored by the state machine.

17. The one or more non-transitory computer readable media according to clauses 10-16, wherein the artifact locations comprise locations of compiled versions of the user code, setup scripts associated with the user code, test suites associated with the user code, generated objects associated with the user code, logs generated during testing and quality assurance associated with the user code, or other metadata associated with the user code.

18. The one or more non-transitory computer readable media according to clauses 10-17, wherein the content creation pipeline is associated with a content streaming platform.

19. According to some embodiments, a system comprises a memory storing a production process orchestrator application; and a processor coupled to the memory, wherein when executed by the processor, the production process orchestrator application causes the processor to publish user code associated with a task included in a content creation pipeline, wherein the task is one of a plurality of tasks associated with the content creation pipeline, wherein the content creation pipeline is configured in a cloud computing environment, and wherein tasks associated with the content creation pipeline can execute in a plurality of computing environments; package the user code separately for each of the plurality of computing environments, wherein each user code package enables the user code to execute within the respective computing environment with without modification to the user code; store artifact locations associated with the user code for each of the plurality of computing environments in a task registry; responsive to the task being selected for execution, determine, based on a set of rules, a computing environment from the plurality of computing environments in which to execute the task; launch the computing environment in accordance with the set of rules; and execute the task in the computing environment using the artifact locations from the task registry.

20. The system according to clause 19, wherein the plurality of computing environments comprises a cloud-computing environment, a data center, a private cloud, and a third-party computing environment.

21. According to some embodiments a computer-implemented method comprises populating a distributed queue with a plurality of job instances, wherein each job instance is tagged with a job type, a constraint type and an associated constraint value, and wherein the constraint type can be associated with one or more rules; mapping each constraint type and associated constraint value to a unique correlation identifier value, wherein the unique correlation identifier value represents an aggregate priority of a corresponding job instance; responsive to a call invocation to the distributed queue to return job instances associated with a particular job type and a particular constraint type in priority order, performing a filtering operation to dequeue job instances with the particular job type identified in the call invocation and a correlation identifier corresponding to the particular constraint type identified in the call invocation; sorting the dequeued job instances based on rules associated with the particular constraint type; and emitting the dequeued job instances in a sorted order of priority in accordance with the call invocation.

22. The computer-implemented method according to clause 21, wherein the plurality of job instances in the distributed queue are distributed over a plurality of computing environments.

23. The computer-implemented method according to clauses 21-22, wherein the plurality of computing environments comprises a cloud-computing environment, a data center, a private cloud, and a third-party computing environment.

24. The computer-implemented method according to clauses 21-23, wherein the plurality of job instances in the distributed queue are distributed over a plurality of computing environments, wherein the plurality of job instances is associated with a content production process, and wherein the distributed queue is managed centrally by a computing device in a central computing environment that is configured to execute the content production process.

25. The computer-implemented method according to clauses 21-24, wherein sorting the dequeued job instances comprises invoking dynamic comparator functions to perform the sorting.

26. The computer-implemented method according to clauses 21-25, wherein sorting the dequeued job instances further comprises performing the sorting based on additional constraint types and corresponding rules associated with the dequeued job instances.

27. The computer-implemented method according to clauses 21-26, wherein changing a priority of a job instance in the plurality of job instances in the distributed queue comprises changing a respective constraint type and corresponding constraint value tagged to the job instance.

28. The computer-implemented method according to clauses 21-27, wherein the filtering operation is performed by a first application layer and sorting the dequeued job instances is performed by a second application layer.

29. The computer-implemented method according to clauses 21-28, wherein the plurality of job instances in the distributed queue are distributed over a plurality of computing environments, wherein the distributed queue is managed centrally by a computing device in a central computing environment, and wherein the computing device in the central computing environment determines in which of the plurality of computing environments a job instance in the distributed queue executes.

30. According to some embodiments, one or more non-transitory computer-readable storage medium include instructions that, when executed by a processor, cause the processor to perform the steps of populating a distributed queue with a plurality of job instances, wherein each job instance is tagged with a job type, a constraint type and an associated constraint value, and wherein the constraint type can be associated with one or more rules; mapping each constraint type and associated constraint value to a unique correlation identifier value, wherein the unique correlation identifier value represents an aggregate priority of a corresponding job instance; responsive to a call invocation to the distributed queue to return job instances associated with a particular job type and a particular constraint type in priority order, performing a filtering operation to dequeue job instances with the particular job type identified in the call invocation and a correlation identifier corresponding to the particular constraint type identified in the call invocation; sorting the dequeued job instances based on rules associated with the particular constraint type; and emitting the dequeued job instances in a sorted order of priority in accordance with the call invocation.

31. The one or more non-transitory computer-readable media according to clause 30, wherein the plurality of job instances in the distributed queue are distributed over a plurality of computing environments.

32. The one or more non-transitory computer-readable media according to clauses 30-31, wherein the plurality of computing environments comprises a cloud-computing environment, a data center, a private cloud, and a third-party computing environment.

33. The one or more non-transitory computer-readable media according to clauses 30-32, wherein the plurality of job instance in the distributed queue are distributed over a plurality of computing environment, wherein the plurality of job instances is associated with a content production process, and wherein the distributed queue is managed centrally by a computing device in a central computing environment that is configured to execute the content production process.

34. The one or more non-transitory computer-readable media according to clauses 30-33, wherein sorting the dequeued job instances comprises invoking dynamic comparator functions to perform the sorting.

35. The one or more non-transitory computer-readable media according to clauses 30-34, wherein sorting the dequeued job instances further comprises performing the sorting based on additional constraint types and corresponding rules associated with the dequeued job instances.

36. The one or more non-transitory computer-readable media according to clauses 30-35, changing a priority of a job instance in the plurality of job instances in the distributed queue comprise changing a respective constraint type and corresponding constraint value tagged to the job instance.

37. According to some embodiments, a system comprises a memory storing a content production process orchestrator application; and a processor coupled to the memory, wherein when executed by the processor, the content production process orchestrator application causes the processor to populate a distributed queue with a plurality of job instances, wherein each job instance is tagged with a job type, a constraint type and an associated constraint value, and wherein the constraint type can be associated with one or more rules; mapping each constraint type and associated constraint value to a unique correlation identifier value, wherein the unique correlation identifier value represents an aggregate priority of a corresponding job instance; responsive to a call invocation to the distributed queue to return job instances associated with a particular job type and a particular constraint type in priority order, performing a filtering operation to dequeue job instances with the particular job type identified in the call invocation and a correlation identifier corresponding to the particular constraint type identified in the call invocation; sorting the dequeued job instances based on rules associated with the particular constraint type; and emitting the dequeued job instances in a sorted order of priority in accordance with the call invocation.

38. The system according to clause 37, wherein the plurality of job instances in the distributed queue are distributed over a plurality of computing environments.

39. The system according to clauses 37-38, wherein the plurality of computing environments comprises a cloud-computing environment, a data center, a private cloud, and a third-party computing environment.

40. The non-transitory computer readable media according to clauses 37-39, wherein the plurality of job instance in the distributed queue are distributed over a plurality of computing environment, wherein the plurality of job instances is associated with a content production process, and wherein the distributed queue is managed centrally by a computing device in a central computing environment that is configured to execute the content production process orchestrator application.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:

populating a distributed queue with a plurality of job instances, wherein each job instance is tagged with a job type, a constraint type and an associated constraint value, and wherein the constraint type can be associated with one or more rules;

mapping each constraint type and associated constraint value to a unique correlation identifier value, wherein the unique correlation identifier value represents an aggregate priority of a corresponding job instance;

responsive to a call invocation to the distributed queue to return job instances associated with a particular job type and a particular constraint type in priority order, performing a filtering operation to dequeue job instances with the particular job type identified in the call invocation and a correlation identifier corresponding to the particular constraint type identified in the call invocation;

sorting the dequeued job instances based on rules associated with the particular constraint type; and emitting the dequeued job instances in a sorted order of priority in accordance with the call invocation.

2. The computer-implemented method of claim 1, wherein the plurality of job instances in the distributed queue are distributed over a plurality of computing environments.

3. The computer-implemented method of claim 2, wherein the plurality of computing environments comprises a cloud-computing environment, a data center, a private cloud, and a third-party computing environment.

4. The computer-implemented method of claim 1, wherein the plurality of job instances in the distributed queue are distributed over a plurality of computing environments, wherein the plurality of job instances is associated with a content production process, and wherein the distributed queue is managed centrally by a computing device in a central computing environment that is configured to execute the content production process.

5. The computer-implemented method of claim 1, wherein sorting the dequeued job instances comprises invoking dynamic comparator functions to perform the sorting.

6. The computer-implemented method of claim 5, wherein sorting the dequeued job instances further comprises performing the sorting based on additional constraint types and corresponding rules associated with the dequeued job instances.

7. The computer-implemented method of claim 1, wherein changing a priority of a job instance in the plurality of job instances in the distributed queue comprises changing a respective constraint type and corresponding constraint value tagged to the job instance.

8. The computer-implemented method of claim 1, wherein the filtering operation is performed by a first application layer and sorting the dequeued job instances is performed by a second application layer.

9. The computer-implemented method of claim 1, wherein the plurality of job instances in the distributed queue are distributed over a plurality of computing environments, wherein the distributed queue is managed centrally by a computing device in a central computing environment, and wherein the computing device in the central computing environment determines in which of the plurality of computing environments a job instance in the distributed queue executes.

10. A non-transitory computer-readable storage medium including instructions that, when executed by a processor, cause the processor to perform the steps of:

populating a distributed queue with a plurality of job instances, wherein each job instance is tagged with a job type, a constraint type and an associated constraint value, and wherein the constraint type can be associated with one or more rules;

mapping each constraint type and associated constraint value to a unique correlation identifier value, wherein the unique correlation identifier value represents an aggregate priority of a corresponding job instance;

responsive to a call invocation to the distributed queue to return job instances associated with a particular job type and a particular constraint type in priority order, performing a filtering operation to dequeue job instances with the particular job type identified in the call invocation and a correlation identifier corresponding to the particular constraint type identified in the call invocation;

sorting the dequeued job instances based on rules associated with the particular constraint type; and emitting the dequeued job instances in a sorted order of priority in accordance with the call invocation.

11. The non-transitory computer-readable storage medium of claim 10, wherein the plurality of job instances in the distributed queue are distributed over a plurality of computing environments.

12. The non-transitory computer-readable storage medium of claim 11, wherein the plurality of computing environments comprises a cloud-computing environment, a data center, a private cloud, and a third-party computing environment.

13. The non-transitory computer-readable storage medium of claim 10, wherein the plurality of job instances in the distributed queue are distributed over a plurality of computing environments, wherein the plurality of job instances is associated with a content production process, and wherein the distributed queue is managed centrally by a computing device in a central computing environment that is configured to execute the content production process.

14. The non-transitory computer-readable storage medium of claim 10, wherein sorting the dequeued job instances comprises invoking dynamic comparator functions to perform the sorting.

15. The non-transitory computer-readable storage medium of claim 10, wherein sorting the dequeued job instances further comprises performing the sorting based on additional constraint types and corresponding rules associated with the dequeued job instances.

16. The non-transitory computer-readable storage medium of claim 10, changing a priority of a job instance in the plurality of job instances in the distributed queue comprise changing a respective constraint type and corresponding constraint value tagged to the job instance.

17. A system, comprising:

a memory storing a content production process orchestrator application; and a processor coupled to the memory, wherein when executed by the processor, the content production process orchestrator application causes the processor to:

populate a distributed queue with a plurality of job instances, wherein each job instance is tagged with a job type, a constraint type and an associated constraint value, and wherein the constraint type can be associated with one or more rules;

map each constraint type and associated constraint value to a unique correlation identifier value, wherein the unique correlation identifier value represents an aggregate priority of a corresponding job instance;

responsive to a call invocation to the distributed queue to return job instances associated with a particular job type and a particular constraint type in priority order, perform a filtering operation to dequeue job instances with the particular job type identified in the call invocation and a correlation identifier corresponding to the particular constraint type identified in the call invocation;

sort the dequeued job instances based on rules associated with the particular constraint type; and emit the dequeued job instances in a sorted order of priority in accordance with the call invocation.

18. The system of claim 17, wherein the plurality of job instances in the distributed queue are distributed over a plurality of computing environments.

19. The system of claim 18, wherein the plurality of computing environments comprises a cloud-computing environment, a data center, a private cloud, and a third-party computing environment.

20. The system of claim 17, wherein the plurality of job instances in the distributed queue are distributed over a plurality of computing environments, wherein the plurality of job instances is associated with a content production process, and wherein the distributed queue is managed centrally by a computing device in a central computing environment that is configured to execute the content production process orchestrator application.

* * * * *